(12) United States Patent
Won et al.

(10) Patent No.: US 12,170,952 B2
(45) Date of Patent: Dec. 17, 2024

(54) METHOD AND APPARATUS FOR ENFORCEMENT OF MAXIMUM NUMBER OF PROTOCOL DATA UNIT SESSIONS PER NETWORK SLICE IN A COMMUNICATION SYSTEM

(71) Applicant: Nokia Technologies Oy, Espoo (FI)

(72) Inventors: Sung Hwan Won, Flower Mound, TX (US); Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 391 days.

(21) Appl. No.: 17/617,799

(22) PCT Filed: Jun. 10, 2019

(86) PCT No.: PCT/IB2019/054829
§ 371 (c)(1),
(2) Date: Dec. 9, 2021

(87) PCT Pub. No.: WO2020/250004
PCT Pub. Date: Dec. 17, 2020

(65) Prior Publication Data
US 2022/0248314 A1 Aug. 4, 2022

(51) Int. Cl.
*H04W 48/18* (2009.01)
*H04W 36/22* (2009.01)
(Continued)

(52) U.S. Cl.
CPC .......... *H04W 48/18* (2013.01); *H04W 36/22* (2013.01); *H04W 48/02* (2013.01);
(Continued)

(58) Field of Classification Search
CPC .................................................. H04W 48/18
See application file for complete search history.

(56) References Cited

U.S. PATENT DOCUMENTS

2009/0049180 A1\* 2/2009 El ........................... H04L 67/56
709/227
2013/0294241 A1 11/2013 Zakrzewski
(Continued)

FOREIGN PATENT DOCUMENTS

WO 2020/186145 A1 9/2020

OTHER PUBLICATIONS

"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.
"3rd Generation Partnership Project; Technical Specification Group Core Network and Terminals; 5G System; Session Management Services; Stage 3 (Release 15)", 3GPP TS 29.502, V15.3.0, Mar. 2019, pp. 1-147.
(Continued)

*Primary Examiner* — Jason E Mattis
(74) *Attorney, Agent, or Firm* — Nokia Technologies Oy

(57) ABSTRACT

Methods, systems, apparatuses, and computer program products for providing an enforcement mechanism for the maximum number of PDU sessions per network slice in a communication system are provided. A method, system, and apparatus may receive, from a user equipment (UE), a protocol data unit (PDU) session establishment request message and Single Network Slice Selection Assistance Information (S-NSSAI) through an access network (AN). The method, system, and apparatus may cause, upon detecting that the S-NSSAI is subject to the capping number of PDU sessions per network slice, transmission of a service request message to a network slice selection function (NSSF). The service request message includes an indication indicating that the S-NSSAI is subject to a capping number of PDU sessions per network slice. The indication may cause the NSSF to increment a counter associated with PDU sessions for a network slice associated with the S-NSSAI.

17 Claims, 15 Drawing Sheets

(51) Int. Cl.
  *H04W 48/02* (2009.01)
  *H04W 74/0833* (2024.01)
  *H04W 76/30* (2018.01)
  *H04W 84/04* (2009.01)

(52) U.S. Cl.
  CPC ......... *H04W 74/085* (2013.01); *H04W 76/30* (2018.02); *H04W 84/042* (2013.01)

(56) References Cited

U.S. PATENT DOCUMENTS

| | | | |
|---|---|---|---|
| 2013/0322274 A1 | 12/2013 | Zakrzewski | |
| 2020/0137675 A1* | 4/2020 | Park | H04W 68/005 |
| 2020/0413241 A1* | 12/2020 | Park | H04W 76/22 |
| 2021/0360564 A1* | 11/2021 | Kawasaki | H04W 60/00 |
| 2022/0159605 A1* | 5/2022 | Li | H04W 60/00 |

OTHER PUBLICATIONS

International Search Report and Written Opinion received for corresponding Patent Cooperation Treaty Application No. PCT/IB2019/054829, dated Feb. 21, 2020, 15 pages.

"NG. 116—Generic Network Slice Template Generic Network Slice Template", GSM Association, Version 1.0, May 23, 2019, pp. 1-60.

"Generic Network Slice Template", 3GPP GSA Attributes, V0.1, Dec. 3, 2018, 53 pages.

"New WID Study on Enhancement of Network Slicing Phase 2", 3GPP TSGIWG-SA WG2 Meeting #134, S2-1907289, Agenda: 7.1, Nokia, Jun. 24-28, 2019, 3 pages.

Notice of Allowance received for corresponding European Patent Application No. 19756239.0, dated May 17, 2023, 8 pages.

Notice of Allowance received for corresponding European Patent Application No. 19756239.0, dated Oct. 23, 2023, 8 pages.

* cited by examiner

METHOD AND APPARATUS FOR ENFORCEMENT OF MAXIMUM NUMBER OF PROTOCOL DATA UNIT SESSIONS PER NETWORK SLICE IN A COMMUNICATION SYSTEM

BACKGROUND

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In a 5G network, network slicing is a concept for running multiple logical networks as virtually independent business operations on a common physical infrastructure. A network slice is considered as an independent virtualized end-to-end network. Currently, standardization efforts are being made on simplying the way network slices are defined and a generic slice template document is created by the GSMA (Groupe Speciale Mobile Association). Such standardized template defines various slice types that meet Service Level Agreement (SLA) criteria. One such SLA criteria is a maximum number of protocol data unit (PDU) sessions admitted to a network slice. However, under the current 3GPP specifications, enforcing such limit is not possible.

BRIEF SUMMARY

A method, apparatus and computer program product are provided in accordance with an example embodiment to provide an enforcement mechanism for the maximum number of PDU sessions per network slice in a communication system.

In one example embodiment, a method is provided that includes receiving, from a user equipment (UE), a protocol data unit (PDU) session establishment request message and Single Network Slice Selection Assistance Information (S-NSSAI) through an access network (AN). The S-NSSAI is subject to a capping number of PDU sessions on a network slice associated with the S-NSSAI. The method further includes causing, upon detecting that the S-NSSAI is subject to the capping number of PDU sessions per network slice, transmission of a service request message to a network slice selection function (NSSF). The service request message includes an indication indicating that the S-NSSAI is subject to the capping number of PDU sessions per network slice. The indication causes the NSSF to increment a counter associated with PDU sessions for a network slice associated with the S-NSSAI in an instance in which the network slice associated with the S-NSSAI has not reached a maximum number of PDU sessions for the S-NSSAI. The method further includes receiving a service response from the network slice selection function. The method further includes causing transmission of a response to the PDU session establishment request message to the user equipment.

In some implementations of such a method, the NSSF is further configured to: determine a number of PDU sessions on the one or more network slices associated with the S-NSSAI; and reject the S-NSSAI in an instance in which the number of PDU sessions equals or exceeds a maximum number on the network slice associated with the S-NSSAI. In some embodiments, the service response includes information representing that a PDU session cannot be established because the maximum number of PDU sessions per network slice has been reached and a backoff timer that causes the UE to not attempt a PDU session establishment request for the network slice until the backoff timer expires. In some embodiments, the response to the PDU session establishment request message comprises information representing that the PDU session cannot be established because the maximum number of PDU sessions per network slice has been reached and the backoff timer that causes the UE to not attempt a PDU session establishment for the network slice until the backoff timer expires. In some embodiments, the service response is dedicated to enforcement of the capping number of PDU sessions per network slice and the capping number of PDU sessions per UE. In some embodiments, the detecting that the S-NSSAI is subject to capping is based on subscription information. In some embodiments, the method further includes causing a message to be transmitted to the NSSF indicating that a PDU session is released in an instance in which the PDU session associated with the S-NSSAI subject to the capping number of PDU sessions per network slice is released. In some embodiments, the NSSF is configured to update one or more counters associated with the S-NSSAI associated with the released PDU session upon receiving the message indicating that the PDU session is released. In some embodiments, the NSSF is a visited Public Land Mobile Network (V-PLMN) NSSF caused to interact with a home Public Land Mobile Network H-PLMN (NSSF) to determine whether the maximum number of PDU sessions for the network slice is exceeded, and wherein the NSSF is configured to transmit a message indicating that a PDU session is established for the UE in an instance which the PDU session is established for the UE.

In another example embodiment, a method is provided that includes causing transmission of an uplink (UL) non-access stratum (NAS) transport message to an access and mobility management function (AMF). The UL NAS transport message includes single network slice selection assistance information (S-NSSAI), a request type set to release request, and a container comprising a protocol data unit (PDU) session release request message. The method further includes causing the AMF to transmit a message to a network slice selection function (NSSF) indicating that a PDU session is released in an instance in which a PDU session associated with the S-NSSAI subject to a capping number of PDU sessions per network slice is released.

In another example embodiment, a method is provided that includes receiving, from a user equipment (UE), a protocol data unit (PDU) session establishment request message comprising Single Network Slice Selection Assistance Information (S-NSSAI) or a data network name (DNN) through an access network (AN). The S-NSSAI or the DNN is subject to a capping number of PDU sessions on a network slice associated with the one S-NSSAI or the data network associated with the DNN. The method further includes causing, upon detecting that the S-NSSAI or the DNN is subject to the capping number of PDU sessions per network slice or data network, transmission of a service request message to a policy control function (PCF). The service request message includes an indication indicating that the the S-NSSAI or the DNN is subject to the capping number of PDU sessions per network slice or data network. The indication causes the PCF to increment a counter associated with PDU sessions for a network slice associated with the S-NSSAI or the data network associated with the DNN in an instance where the network slice associated with the —NSSAI or the data network associated with the DNN has not reached a maximum number of PDU sessions for the S-NSSAI or the DNN. The method further includes receiving a service response from the PCF. The method further includes causing transmission of a response to the PDU session establishment request message to the user equipment.

In some implementations of such a method, the PCF is further configured to: determine a number of PDU sessions on the one or more network slices associated with the S-NSSAI or the one or more data networks associated with the DNN; and reject the S-NSSAI or the DNN in an instance in which the number of PDU sessions equals or exceeds a maximum number on the network slice associated with the S-NSSAI or the data network associated with the DNN. In some embodiments, the service response includes information representing that a PDU session cannot be established because the maximum number of PDU sessions per network slice or data network has been reached and a backoff timer that causes the UE to not attempt a PDU session establishment for the network slice until the backoff timer expires. In some embodiments, the response to the PDU session establishment request message comprises information representing that the PDU session cannot be established because the maximum number of PDU sessions per network slice or data network has been reached and the backoff timer that causes the UE to not attempt a PDU session establishment for the network slice or data network until the backoff timer expires. In some embodiments, the detecting that the S-NSSAI or the DNN is subject to capping is based on configuration information. In some embodiments, the method further includes causing a message to be transmitted to the PCF indicating that a PDU session is released in an instance in which the PDU session associated with the S-NSSAI or the DNN subject to the capping number of PDU sessions per network slice or data network is released.

In another embodiments, an apparatus comprising processing circuitry and at least one memory including computer program code for one or more programs is provided, the at least one memory and the computer program code configured to, with the processing circuitry, cause the apparatus at least to receive, from a user equipment (UE), a protocol data unit (PDU) session establishment request message and Single Network Slice Selection Assistance Information (S-NSSAI) through an access network (AN). The S-NSSAI is subject to a capping number of PDU sessions on a network slice associated with the S-NSSAI. The at least one memory and the computer program code are further configured to, with the processing circuitry, cause the apparatus to cause, upon detecting that the S-NSSAI is subject to the capping number of PDU sessions per network slice, transmission of a service request message to a network slice selection function (NSSF). The service request message includes an indication indicating that the S-NSSAI is subject to the capping number of PDU sessions per network slice. The indication causes the NSSF to increment a counter associated with PDU sessions for a network slice associated with the S-NSSAI in an instance in which the network slice associated with the S-NSSAI has not reached a maximum number of PDU sessions for the S-NSSAI. The at least one memory and the computer program code are further configured to, with the processing circuitry, cause the apparatus to receiveg a service response from the network slice selection function. The at least one memory and the computer program code are further configured to, with the processing circuitry, cause the apparatus to causing transmission of a response to the PDU session establishment request message to the user equipment.

In some implementations of such an apparatus, the NSSF is further configured to: determine a number of PDU sessions on the one or more network slices associated with the S-NSSAI; and reject the S-NSSAI in an instance in which the number of PDU sessions equals or exceeds a maximum number on the network slice associated with the S-NSSAI. In some embodiments, the service response includes information representing that a PDU session cannot be established because the maximum number of PDU sessions per network slice has been reached and a backoff timer that causes the UE to not attempt a PDU session establishment request for the network slice until the backoff timer expires. In some embodiments, the response to the PDU session establishment request message comprises information representing that the PDU session cannot be established because the maximum number of PDU sessions per network slice has been reached and the backoff timer that causes the UE to not attempt a PDU session establishment for the network slice until the backoff timer expires. In some embodiments, the service response is dedicated to enforcement of the capping number of PDU sessions per network slice and the capping number of PDU sessions per UE. In some embodiments, the detecting that the S-NSSAI is subject to capping is based on subscription information. In some embodiments, the at least one memory and the computer program code are further configured to, with the processing circuitry, cause the apparatus to cause a message to be transmitted to the NSSF indicating that a PDU session is released in an instance in which the PDU session associated with the S-NSSAI subject to the capping number of PDU sessions per network slice is released. In some embodiments, the NSSF is configured to update one or more counters associated with the S-NSSAI associated with the released PDU session upon receiving the message indicating that the PDU session is released. In some embodiments, the NSSF is a visited Public Land Mobile Network (V-PLMN) NSSF caused to interact with a home Public Land Mobile Network H-PLMN (NSSF) to determine whether the maximum number of PDU sessions for the network slice is exceeded, and wherein the NSSF is configured to transmit a message indicating that a PDU session is established for the UE in an instance which the PDU session is established for the UE.

In another example embodiment, an apparatus comprising processing circuitry and at least one memory including computer program code for one or more programs is provided, the at least one memory and the computer program code configured to, with the processing circuitry, cause the apparatus at least to cause transmission of an uplink (UL) non-access stratum (NAS) transport message to an access and mobility management function (AMF). The UL NAS transport message includes single network slice selection assistance information (S-NSSAI), a request type set to release request, and a container comprising a protocol data unit (PDU) session release request message. The at least one memory and the computer program code are further configured to, with the processing circuitry, cause the apparatus to cause the AMF to transmit a message to a network slice selection function (NSSF) indicating that a PDU session is released in an instance in which a PDU session associated with the S-NSSAI subject to a capping number of PDU sessions per network slice is released.

In another example embodiment, an apparatus comprising processing circuitry and at least one memory including computer program code for one or more programs is provided, the at least one memory and the computer program code configured to, with the processing circuitry, cause the apparatus at least to receive, from a user equipment (UE), a protocol data unit (PDU) session establishment request message comprising Single Network Slice Selection Assistance Information (S-NSSAI) or a data network name (DNN) through an access network (AN). The S-NSSAI or the DNN is subject to a capping number of PDU sessions on a network slice associated with the one S-NSSAI or the data network associated with the DNN. The at least one memory and the computer program code are further configured to, with the processing circuitry, cause the apparatus to cause, upon detecting that the S-NSSAI or the DNN is subject to the capping number of PDU sessions per network slice or data network, transmission of a service request message to a policy control function (PCF). The service request message includes an indication indicating that the the S-NSSAI or the DNN is subject to the capping number of PDU sessions per network slice or data network. The indication causes the PCF to increment a counter associated with PDU sessions for a network slice associated with the S-NSSAI or the data network associated with the DNN in an instance where the network slice associated with the -NSSAI or the data network associated with the DNN has not reached a maximum number of PDU sessions for the S-NSSAI or the DNN. The at least one memory and the computer program code are further configured to, with the processing circuitry, cause the apparatus to receive a service response from the PCF. The at least one memory and the computer program code are further configured to, with the processing circuitry, cause the apparatus to cause transmission of a response to the PDU session establishment request message to the user equipment.

In some implementations of such an apparatus, the PCF is further configured to: determine a number of PDU sessions on the one or more network slices associated with the S-NSSAI or the one or more data networks associated with the DNN; and reject the S-NSSAI or the DNN in an instance in which the number of PDU sessions equals or exceeds a maximum number on the network slice associated with the S-NSSAI or the data network associated with the DNN. In some embodiments, the service response includes information representing that a PDU session cannot be established because the maximum number of PDU sessions per network slice or data network has been reached and a backoff timer that causes the UE to not attempt a PDU session establishment for the network slice until the backoff timer expires. In some embodiments, the response to the PDU session establishment request message comprises information representing that the PDU session cannot be established because the maximum number of PDU sessions per network slice or data network has been reached and the backoff timer that causes the UE to not attempt a PDU session establishment for the network slice or data network until the backoff timer expires. In some embodiments, the detecting that the S-NSSAI or the DNN is subject to capping is based on configuration information. In some embodiments, the at least one memory and the computer program code are further configured to, with the processing circuitry, cause the apparatus to cause a message to be transmitted to the PCF indicating that a PDU session is released in an instance in which the PDU session associated with the S-NSSAI or the DNN subject to the capping number of PDU sessions per network slice or data network is released.

In another embodiments, a computer program product is provided, the computer program product comprises at least one non-transitory computer-readable storage medium having computer executable program code instructions stored therein, the computer executable program code instructions comprising program code instructions configured, upon execution, to receive, from a user equipment (UE), a protocol data unit (PDU) session establishment request message and Single Network Slice Selection Assistance Information (S-NSSAI) through an access network (AN). The S-NSSAI is subject to a capping number of PDU sessions on a network slice associated with the S-NSSAI. The computer executable program code instructions further include program code instructions configured, upon execution, to cause, upon detecting that the S-NSSAI is subject to the capping number of PDU sessions per network slice, transmission of a service request message to a network slice selection function (NSSF). The service request message includes an indication indicating that the S-NSSAI is subject to the capping number of PDU sessions per network slice. The indication causes the NSSF to increment a counter associated with PDU sessions for a network slice associated with the S-NSSAI in an instance in which the network slice associated with the S-NSSAI has not reached a maximum number of PDU sessions for the S-NSSAI. The computer executable program code instructions further include program code instructions configured, upon execution, to receive a service response from the network slice selection function. The computer executable program code instructions further include program code instructions configured, upon execution, to cause transmission of a response to the PDU session establishment request message to the user equipment.

In some implementations of such a computer program product, the NSSF is further configured to: determine a number of PDU sessions on the one or more network slices associated with the S-NSSAI; and reject the S-NSSAI in an instance in which the number of PDU sessions equals or exceeds a maximum number on the network slice associated with the S-NSSAI. In some embodiments, the service response includes information representing that a PDU session cannot be established because the maximum number of PDU sessions per network slice has been reached and a backoff timer that causes the UE to not attempt a PDU session establishment request for the network slice until the backoff timer expires. In some embodiments, the response to the PDU session establishment request message comprises information representing that the PDU session cannot be established because the maximum number of PDU sessions per network slice has been reached and the backoff timer that causes the UE to not attempt a PDU session establishment for the network slice until the backoff timer expires. In some embodiments, the service response is dedicated to enforcement of the capping number of PDU sessions per network slice and the capping number of PDU sessions per UE. In some embodiments, the detecting that the S-NSSAI is subject to capping is based on subscription information. In some embodiments, the computer executable program code instructions further include program code instructions configured, upon execution, to cause a message to be transmitted to the NSSF indicating that a PDU session is released in an instance in which the PDU session associated with the S-NSSAI subject to the capping number of PDU sessions per network slice is released. In some embodiments, the NSSF is configured to update one or more counters associated with the S-NSSAI associated with the released PDU session upon receiving the message indicating that the PDU session is released. In some embodiments, the NSSF is a visited Public Land Mobile Network (V-PLMN) NSSF caused to interact with a home Public Land Mobile Network H-PLMN (NSSF) to determine whether the maximum number of PDU sessions for the network slice is exceeded, and wherein the NSSF is configured to transmit a message indicating that a PDU session is established for the UE in an instance which the PDU session is established for the UE.

In another embodiments, a computer program product is provided, the computer program product comprises at least one non-transitory computer-readable storage medium having computer executable program code instructions stored therein, the computer executable program code instructions comprising program code instructions configured, upon execution, to cause transmission of an uplink (UL) non-access stratum (NAS) transport message to an access and mobility management function (AMF). The UL NAS transport message includes single network slice selection assistance information (S-NSSAI), a request type set to release request, and a container comprising a protocol data unit (PDU) session release request message. The computer executable program code instructions further include program code instructions configured, upon execution, to cause the AMF to transmit a message to a network slice selection function (NSSF) indicating that a PDU session is released in an instance in which a PDU session associated with the S-NSSAI subject to a capping number of PDU sessions per network slice is released.

In another embodiments, a computer program product is provided, the computer program product comprises at least one non-transitory computer-readable storage medium having computer executable program code instructions stored therein, the computer executable program code instructions comprising program code instructions configured, upon execution, to receive, from a user equipment (UE), a protocol data unit (PDU) session establishment request message comprising Single Network Slice Selection Assistance Information (S-NSSAI) or a data network name (DNN) through an access network (AN). The S-NSSAI or the DNN is subject to a capping number of PDU sessions on a network slice associated with the one S-NSSAI or the data network associated with the DNN. The The computer executable program code instructions further include program code instructions configured, upon execution, to cause, upon detecting that the S-NSSAI or the DNN is subject to the capping number of PDU sessions per network slice or data network, transmission of a service request message to a policy control function (PCF). The service request message includes an indication indicating that the the S-NSSAI or the DNN is subject to the capping number of PDU sessions per network slice or data network. The indication causes the PCF to increment a counter associated with PDU sessions for a network slice associated with the S-NSSAI or the data network associated with the DNN in an instance where the network slice associated with the -NSSAI or the data network associated with the DNN has not reached a maximum number of PDU sessions for the S-NSSAI or the DNN. The computer executable program code instructions further include program code instructions configured, upon execution, to receive a service response from the PCF. The computer executable program code instructions further include program code instructions configured, upon execution, to cause transmission of a response to the PDU session establishment request message to the user equipment.

In some implementations of such a computer program product, the PCF is further configured to: determine a number of PDU sessions on the one or more network slices associated with the S-NSSAI or the one or more data networks associated with the DNN; and reject the S-NSSAI or the DNN in an instance in which the number of PDU sessions equals or exceeds a maximum number on the network slice associated with the S-NSSAI or the data network associated with the DNN. In some embodiments, the service response includes information representing that a PDU session cannot be established because the maximum number of PDU sessions per network slice or data network has been reached and a backoff timer that causes the UE to not attempt a PDU session establishment for the network slice until the backoff timer expires. In some embodiments, the response to the PDU session establishment request message comprises information representing that the PDU session cannot be established because the maximum number of PDU sessions per network slice or data network has been reached and the backoff timer that causes the UE to not attempt a PDU session establishment for the network slice or data network until the backoff timer expires. In some embodiments, the detecting that the S-NSSAI or the DNN is subject to capping is based on configuration information. In some embodiments, computer executable program code instructions further include program code instructions configured, upon execution, to cause a message to be transmitted to the PCF indicating that a PDU session is released in an instance in which the PDU session associated with the S-NSSAI or the DNN subject to the capping number of PDU sessions per network slice or data network is released.

In another example embodiment, an apparatus is provided that includes means for receiving, from a user equipment (UE), a protocol data unit (PDU) session establishment request message and Single Network Slice Selection Assistance Information (S-NSSAI) through an access network (AN). The S-NSSAI is subject to a capping number of PDU sessions on a network slice associated with the S-NSSAI. The apparatus further includes means for causing, upon detecting that the S-NSSAI is subject to the capping number of PDU sessions per network slice, transmission of a service request message to a network slice selection function (NSSF). The service request message includes an indication indicating that the S-NSSAI is subject to the capping number of PDU sessions per network slice. The indication causes the NSSF to increment a counter associated with PDU sessions for a network slice associated with the S-NSSAI in an instance in which the network slice associated with the S-NSSAI has not reached a maximum number of PDU sessions for the S-NSSAI. The apparatus further includes means for receiving a service response from the network slice selection function. The apparatus further includes means for causing transmission of a response to the PDU session establishment request message to the user equipment.

In some implementations of such an apparatus, the NSSF is further configured to: determine a number of PDU sessions on the one or more network slices associated with the S-NSSAI; and reject the S-NSSAI in an instance in which the number of PDU sessions equals or exceeds a maximum number on the network slice associated with the S-NSSAI. In some embodiments, the service response includes information representing that a PDU session cannot be established because the maximum number of PDU sessions per network slice has been reached and a backoff timer that causes the UE to not attempt a PDU session establishment request for the network slice until the backoff timer expires. In some embodiments, the response to the PDU session establishment request message comprises information representing that the PDU session cannot be established because the maximum number of PDU sessions per network slice has been reached and the backoff timer that causes the UE to not attempt a PDU session establishment for the network slice until the backoff timer expires. In some embodiments, the service response is dedicated to enforcement of the capping number of PDU sessions per network slice and the capping number of PDU sessions per UE. In some embodiments, the detecting that the S-NSSAI is subject to capping is based on subscription information. In some embodiments, the apparatus further includes means for causing a message to be transmitted to the NSSF indicating that a PDU session is released in an instance in which the PDU session associated with the S-NSSAI subject to the capping number of PDU sessions per network slice is released. In some embodiments, the NSSF is configured to update one or more counters associated with the S-NSSAI associated with the released PDU session upon receiving the message indicating that the PDU session is released. In some embodiments, the NSSF is a visited Public Land Mobile Network (V-PLMN) NSSF caused to interact with a home Public Land Mobile Network H-PLMN (NSSF) to determine whether the maximum number of PDU sessions for the network slice is exceeded, and wherein the NSSF is configured to transmit a message indicating that a PDU session is established for the UE in an instance which the PDU session is established for the UE.

In another example embodiment, an apparatus is provided that includes means for causing transmission of an uplink (UL) non-access stratum (NAS) transport message to an access and mobility management function (AMF). The UL NAS transport message includes single network slice selection assistance information (S-NSSAI), a request type set to release request, and a container comprising a protocol data unit (PDU) session release request message. The apparatus further includes means for causing the AMF to transmit a message to a network slice selection function (NSSF) indicating that a PDU session is released in an instance in which a PDU session associated with the S-NSSAI subject to a capping number of PDU sessions per network slice is released.

In another example embodiment, an apparatus is provided that includes means for receiving, from a user equipment (UE), a protocol data unit (PDU) session establishment request message comprising Single Network Slice Selection Assistance Information (S-NSSAI) or a data network name (DNN) through an access network (AN). The S-NSSAI or the DNN is subject to a capping number of PDU sessions on a network slice associated with the one S-NSSAI or the data network associated with the DNN. The apparatus further includes means for causing, upon detecting that the S-NSSAI or the DNN is subject to the capping number of PDU sessions per network slice or data network, transmission of a service request message to a policy control function (PCF). The service request message includes an indication indicating that the the S-NSSAI or the DNN is subject to the capping number of PDU sessions per network slice or data network. The indication causes the PCF to increment a counter associated with PDU sessions for a network slice associated with the S-NSSAI or the data network associated with the DNN in an instance where the network slice associated with the -NSSAI or the data network associated with the DNN has not reached a maximum number of PDU sessions for the S-NSSAI or the DNN. The apparatus further includes means for receiving a service response from the PCF. The apparatus further includes means for causing transmission of a response to the PDU session establishment request message to the user equipment.

In some implementations of such an apparatus, the PCF is further configured to: determine a number of PDU sessions on the one or more network slices associated with the S-NSSAI or the one or more data networks associated with the DNN; and reject the S-NSSAI or the DNN in an instance in which the number of PDU sessions equals or exceeds a maximum number on the network slice associated with the S-NSSAI or the data network associated with the DNN. In some embodiments, the service response includes information representing that a PDU session cannot be established because the maximum number of PDU sessions per network slice or data network has been reached and a backoff timer that causes the UE to not attempt a PDU session establishment for the network slice until the backoff timer expires. In some embodiments, the response to the PDU session establishment request message comprises information representing that the PDU session cannot be established because the maximum number of PDU sessions per network slice or data network has been reached and the backoff timer that causes the UE to not attempt a PDU session establishment for the network slice or data network until the backoff timer expires. In some embodiments, the detecting that the S-NSSAI or the DNN is subject to capping is based on configuration information. In some embodiments, the apparatus further includes means for causing a message to be transmitted to the PCF indicating that a PDU session is released in an instance in which the PDU session associated with the S-NSSAI or the DNN subject to the capping number of PDU sessions per network slice or data network is released.

BRIEF DESCRIPTION OF THE DRAWINGS

Figure 1:
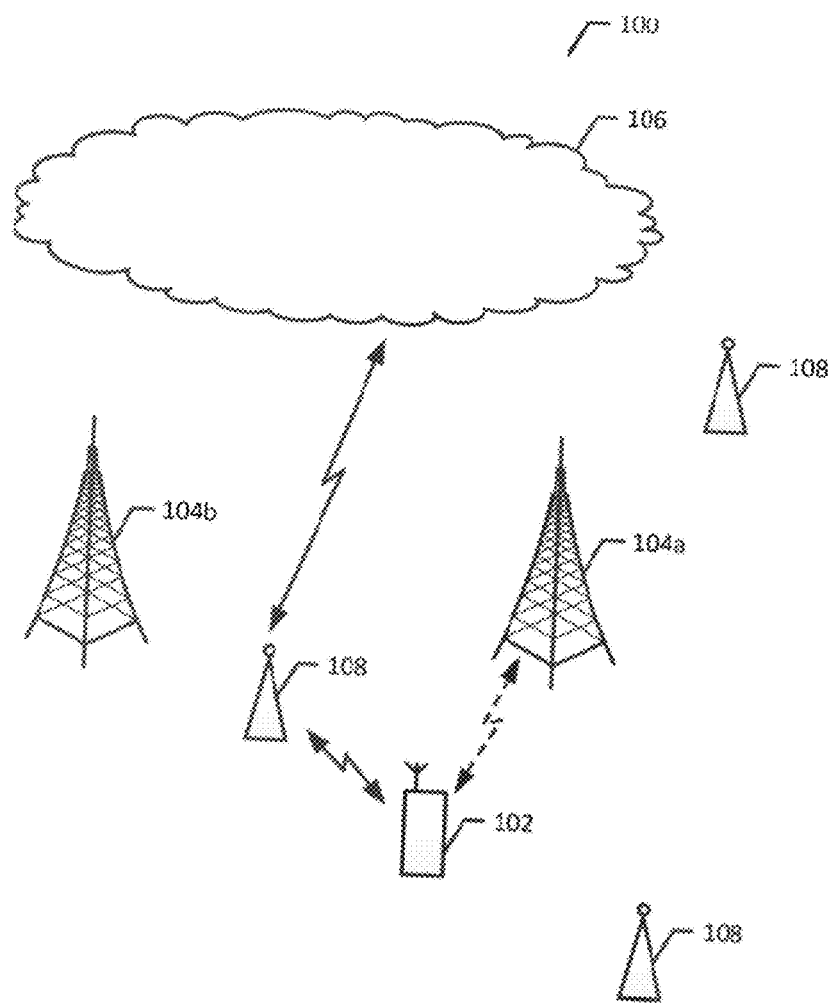
Figure 2:
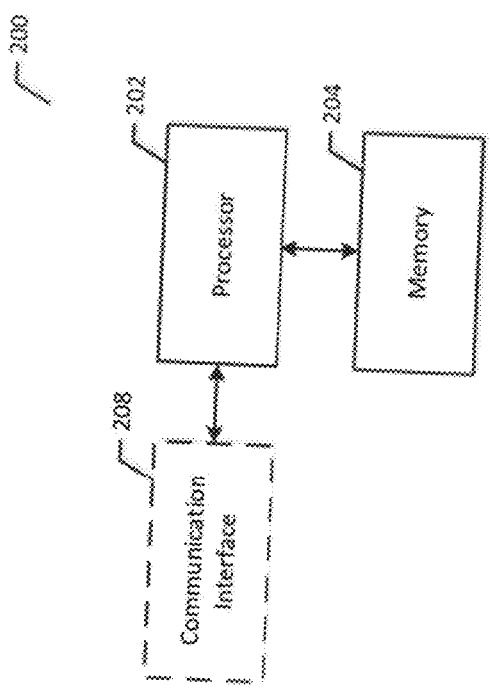
Figure 3:
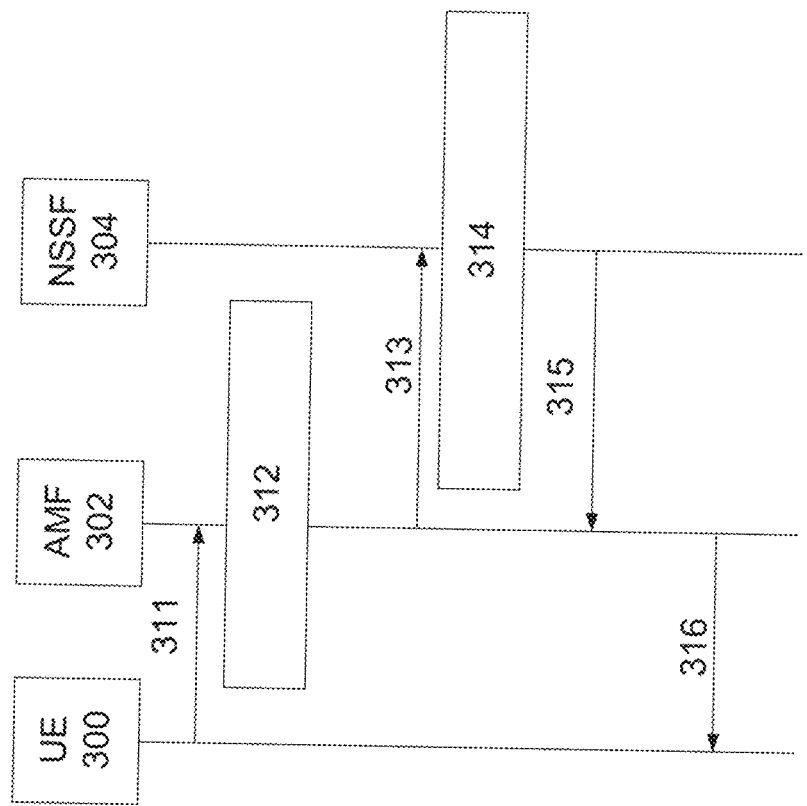
Figure 4:
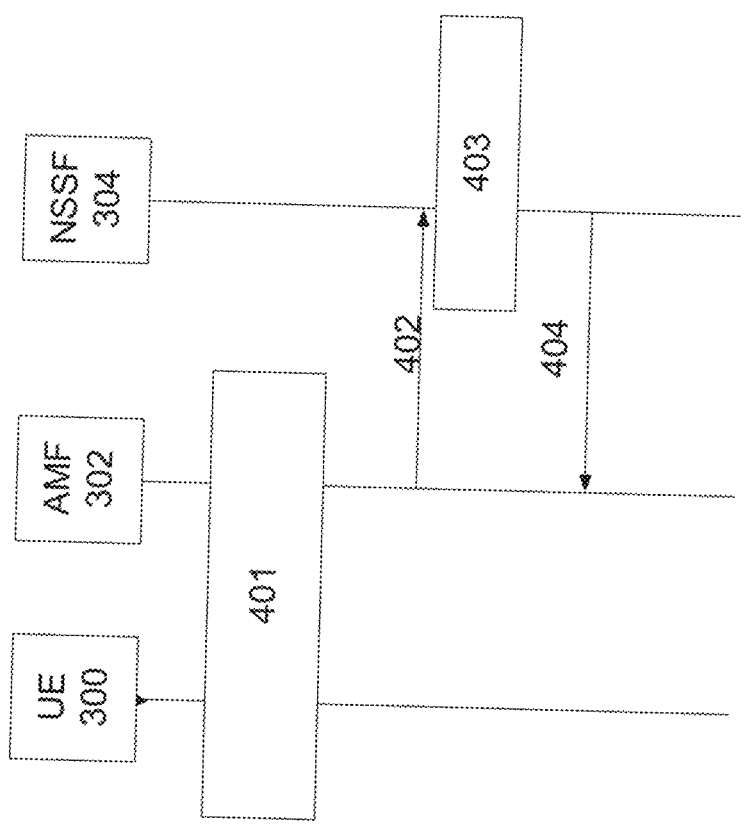
Figure 5:
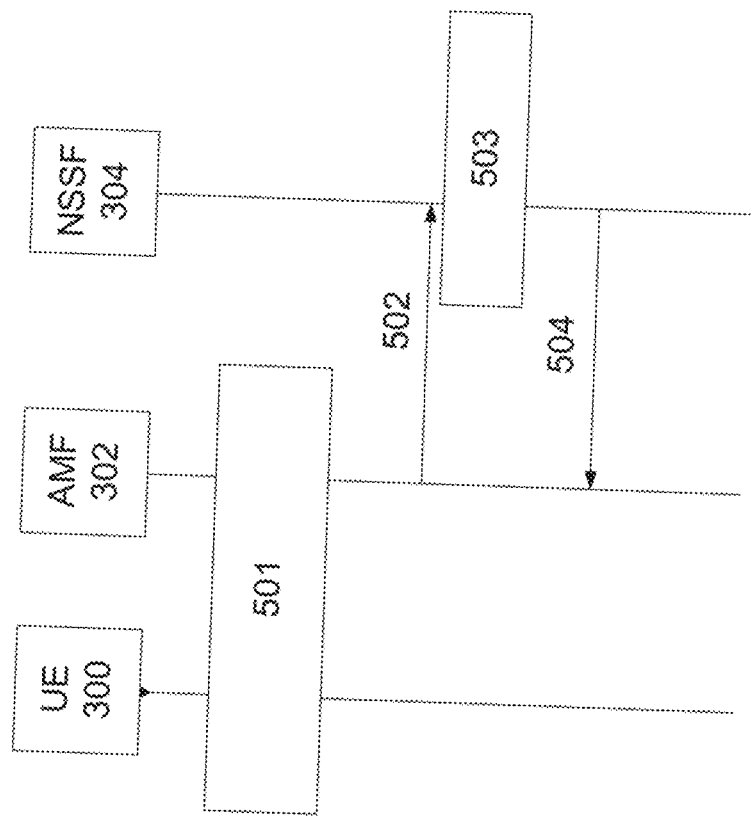
Figure 6:
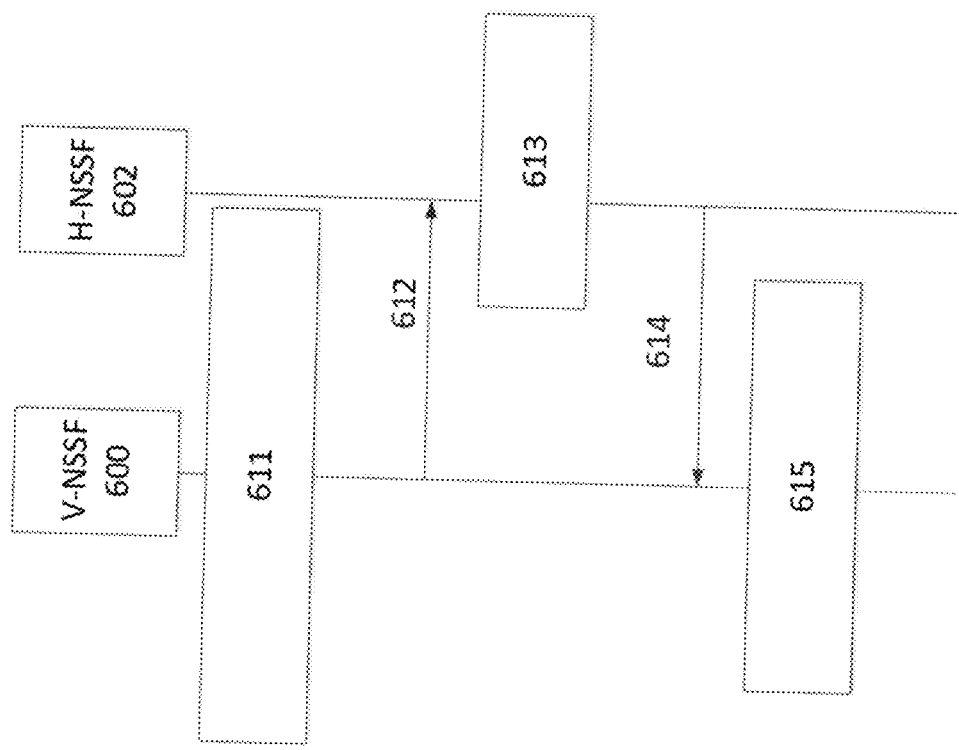
Figure 7:
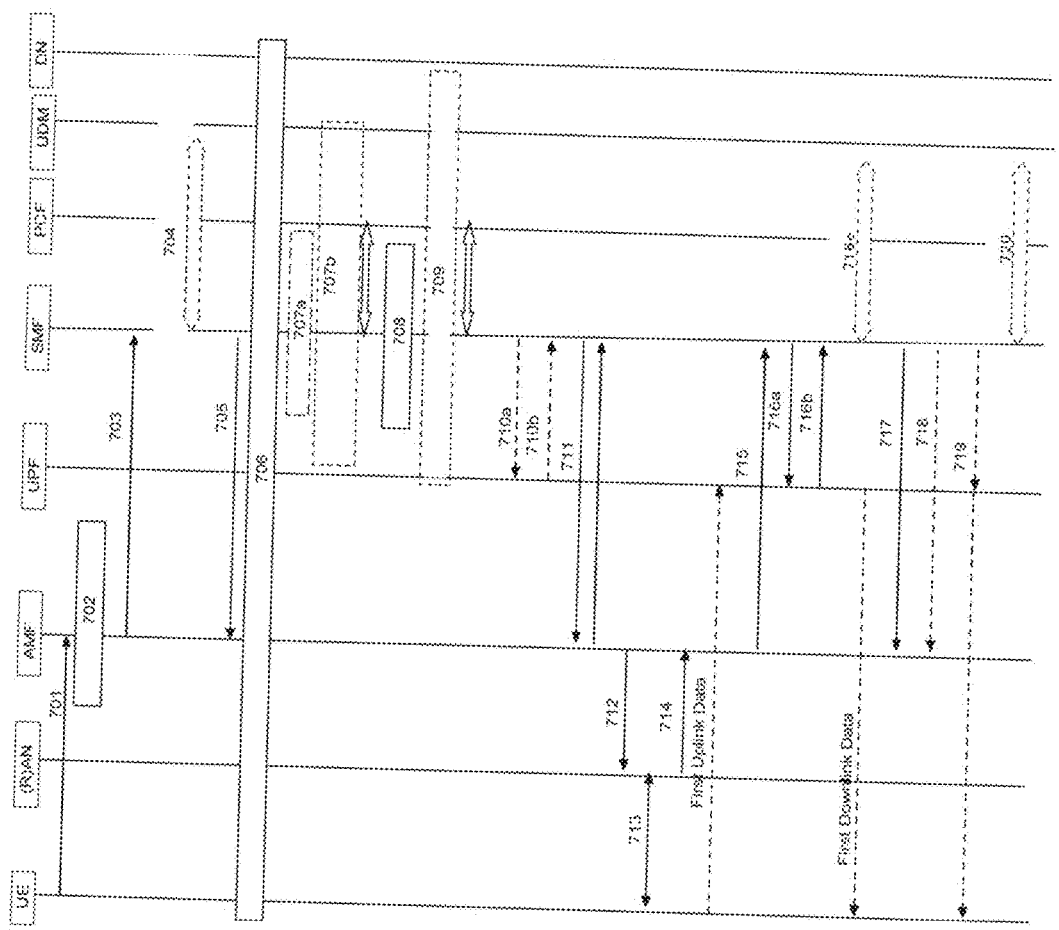
Figure 8:
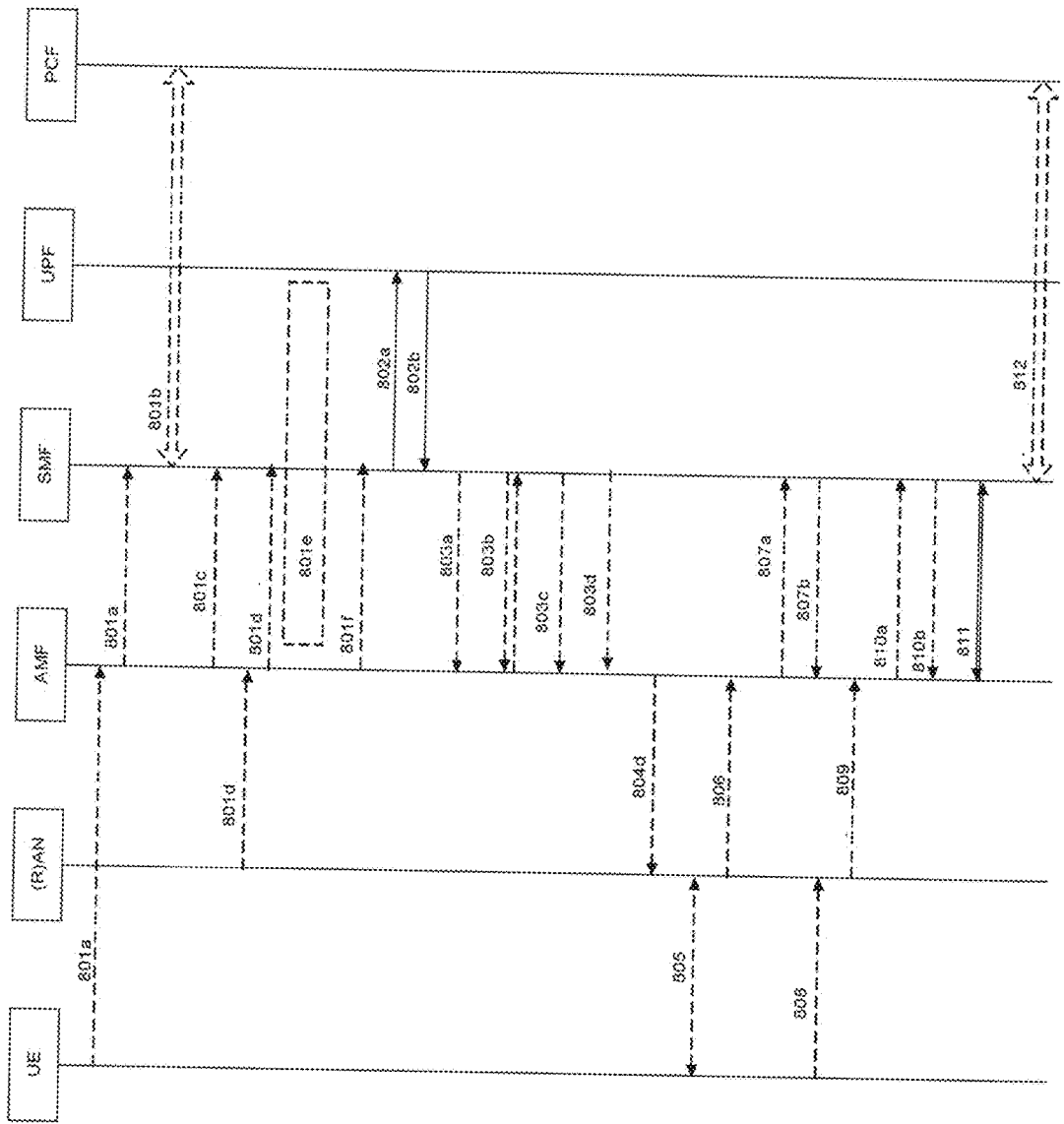

Having thus described certain example embodiments of the invention in general terms, reference will now be made to the accompanying drawings, which are not necessarily drawn to scale, and wherein:

FIG. 1 depicts an example system environment in which implementations in accordance with an example embodiment of the present invention may be performed;

FIG. 2 is a block diagram of a core network apparatus configured in accordance with an example embodiment of the present disclosure;

FIG. 3 illustrates example transmissions between a user equipment and a communication system for establishing a PDU session in accordance with an example embodiment of the present disclosure;

FIG. 4 illustrates example transmissions between a user equipment and a communication system for releasing a PDU session in accordance with an example embodiment of the present disclosure;

FIG. 5 illustrates example transmissions between a user equipment and a communication system for deregistering a user equipment in accordance with an example embodiment of the present disclosure;

FIG. 6 illustrates example transmissions between a home Network Slice Selection Function (NSSF) and a visited NSSF in a communication system in accordance with an example embodiment of the present disclosure;

FIG. 7 illustrates a PDU establishment process in a PDU based approach for enforcement of the capping number of PDU sessions per network slice in a communication system in accordance with an example embodiment of the present disclosure;

FIG. 8 illustrates a PDU release process in a PDU based approach for enforcement of the capping number of PDU sessions per network slice in a communication system in accordance with an example embodiment of the present disclosure; and FIGS. 9A, 9B, 9C, 9D, 9E, 9F, and 9G are flowcharts illustrating workflows of various components of a communication system in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In a 5G network, network slicing is a concept for running multiple logical networks as virtually independent business operations on a common physical infrastructure. A network slice is considered as an independent virtualized end-to-end network. Currently, standardization efforts are being made on simplying the way network slices are defined and a generic slice template document is created by the GSMA (Groupe Speciale Mobile Association). Such standardized template defines various slice types that meet Service Level Agreement (SLA) criteria. One such SLA criteria is a maximum number of protocol data unit (PDU) sessions admitted to a slice. However, under the current 3GPP specifications, enforcing such limit is not possible. Therefore, a solution is needed to enforce capping the number of PDU sessions in a network slice in a 5G communication system.

A method, apparatus and computer program product are provided in accordance with an example embodiment to provide an enforcement mechanism for the maximum number of PDU sessions per network slice in a communication system.

In addition, limiting only the total number of PDU sessions in a slice could result in an issue with fairness across the UEs. For example, when the maximum number of PDU sessions in a slice identified by single Network Slice Selection Assistance Information (S-NSSAI)S-NSSAI$_X$ is reached, UE$_A$ can have two PDU sessions with S-NSSAI$_X$ and UE$_B$ can have five PDU sessions with S-NSSAI$_X$, thereby disproportionately favoring UE$_B$. An example embodiment of the method, apparatus and computer program product therefore enforces the maximum number of PDU sessions per network slice in a manner that is more fair across the UEs.

FIG. 1 depicts an example communication system environment in which implementations in accordance with an example embodiment of the present invention may be performed. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 104a and 104b, such as base stations, including but not limited to node Bs, evolved Node Bs (eNB), or the like. A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b. The user equipment 102 is able to access the network 106 via a radio access network provided across access points. Although not shown, the system may also include a controller associated with one or more of the cellular access points, such as, base stations, for example, so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

In this regard, the implementation and/or allocation of a network slice within a network environment can be accomplished by an apparatus 200 as depicted in FIG. 2. The apparatus may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include one or more of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means including processing circuitry, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 may optionally include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

On a high level, several different embodiments based on different approaches are provided herein. In some NSSF based embodiments, slice related subscription data includes a flag indicating whether the number of PDU sessions need to be limited for an S-NSSAI. The flag may then trigger, at PDU session establishment and release time, reporting to the NSSF that a PDU session is established or released for a certain S-NSSAI and DNN (Data Network Name). The reporting may also happen at "detach" of the UE, e.g., when the UE abandons or joins certain slices and the sessions are released. In a roaming case, the limit is enforced by the home Public Land Mobile Network (H-PLMN).

In some PCF based embodiments, the PCF functions as a centralized control to reconcile the number of connections per network slice. In this regard, the SMF checks that there is a flag in the subscription data or in its configuration per S-NSSAI with the flag indicating that the number of PDU sessions per network slice needs to be limited. If the number of PDU sessions per UE needs to be limited, the flag indicates to the SMF that the SMF needs to report to the PCF at PDU session establishment and release. Accordingly, the PCF can enforce the cap or limit on the number of PDU sessions by incrementing or decrementing a counter. The limitation in the PCF is useful as the UE may be served by multiple SMFs for the same slice.

When the maximum number of PDU sessions is reached for an S-NSSAI, the NSSF or PCF indicates to an AMF or SMF, respectively, that the PDU session establishment for the specific S-NSSAI or DNN has been rejected. Optionally, a back off time is indicated to the UE that applies to the S-NSSAIs to avoid new PDU session establishment for this UE for at least a period of time defined by the back off time.

In some PCF and NSSF based embodiments in which the limit on PDU sessions has been reached, the network may start releasing other PDU sessions for UEs that exceed a certain number of PDU sessions per UE in the slice in order to more fairly allocate the limited PDU sessions. In some NSSF based embodiments, the NSSF interacts with a network data analytics function (NWDAF) and the NWDAF triggers the PCF to start to keep track of the UEs for the specific S-NSSAI. In some NSSF based embodiments, the AMF reports to the NSSF the number of PDU sessions that the slice has active already when another PDU session establishment is attempted for the same slice.

In some embodiments related to roaming, the NSSF of the visited Public Land Mobile Network (V-PLMN) can be configured per S-NSSAI of the H-PLMN to report to the H-PLMN NSSF that a user joins or leaves an S-NSSAI and DNN. In some embodiments, the NSSF of the V-PLMN receives, from the AMF, a flag per S-NSSAI that indicates whether the S-NSSAI of the H-PLMN requires enforcement of maximum number of PDU sessions per network slice. Accordingly, the H-PLMN NSSF controls the maximum number per H-PLMN S-NSSAIs. If an upper limit is reached, the H-PLMN NSSF responds to the V-PLMN NSSF that the upper limit is reached and the NSSF may then indicate to the AMF that the upper limit has been reached.

FIG. 3 illustrates example transmissions between a user equipment and a communication system for establishing a PDU session in accordance with an example embodiment of the present disclosure. As illustrated in FIG. 3, at operation 311, UE 300 transmits a PDU session establishment request to the ANF 302. The PDU session establishment request includes one or more S-NSSAIs and DNN. The S-NSSAI may be associated with a V-PLMN or H-PLMN. If a UE needs a new PDU session associated with the S-NSSAI and/or DNN, the UE of an example embodiment creates a PDU SESSION ESTABLISHMENT REQUEST message and encapsulates the message and S-NSSAI and/or DNN in an UL NAS TRANSPORT message. Upon receiving the UL NAS TRANSPORT message, AMF checks the subscription information that may indicate a set of S-NSSAIs, a set of DNNs, and/or a set of S-NSSAI and DNN combinations subject to the limitation of the number of PDU sessions per network slice and/or data network.

As illustrated in block 312, the AMF 302 determines that the S-NSSAI of the V-PLMN or H-PLMN is subject to capping of the number of PDU sessions per network slice for a network slice associated with the S-NSSAI. In some embodiments, as illustrated in operation 313, the AMF 302 transmits a service request message, such as an Nnssf_service service request message dedicated to enforcement of capping of the number of PDU sessions per network slice to the NSSF 304. The service request message includes the S-NSSAIs and DNN. In some embodiments, if the S-NSSAI DNN included in the UL NAS TRANSPORT message (or the S-NSSAI selected by the ANF in case the message does not include S-NSSAI) is subject to capping based on checking the subscription data, NSSF interaction is invoked. The NSSF may be provided with a cap value indicating the maximum number of PDU sessions from the subscription data. In some embodiments, the NSSF is configured to be configured with the number of PDU sessions allowed per S-NSSAI and/or DNN subject to capping.

At operation 314, the NSSF 304 increments or otherwise updates one or more counters for S-NSSAIs that have been requested a PDU session, subject to the capping number of PDU sessions per network slice, and have not had maximum number of PDU sessions currently. For S-NSSAIs that already has maximum number of PDU sessions established (which may be referred to as capped), the NSSF may trigger a capping action. The capping action may include determining a back-off timer and starting triggering policies to limit the number of PDU sessions associated with the S-NSSAI and/or DNN per UE.

At operation 315, the NSSF 304 transmits a service response, such as an Nnssf_service response dedicated to enforcement of the capping of the number of PDU sessions per network slice to the AMF 302. For each capped S-NSSAI, the service response may include a reject cause indicating the S-NSSAI is capped and optionally any back-off timer for each of the rejected S-NSSAI(s), DNN(s), and/or S-NSSAI and DNN combinations and any trigger for action of the S-NSSAIs and/or DNNs per PDU session. In some embodiments, the NSSF can trigger the reduction of number of PDU sessions per network slice and/or data network per UE at any time based on the policy.

At operation 316, the AMF 302 transmits a response to the PDU session establishment request message such as a PDU session establishment ACCEPT or PDU session establishment REJECT to the UE 300. In some embodiments, the response to the PDU session establishment request message includes a reject cause indicating one or more S-NSSAIs are capped and an optional back-off timer for each of one or more S-NSSAIs. In some embodiments, the response to the PDU session establishment request message includes a DL NAS TRANSPORT message including:

a. the PDU SESSION ESTABLISHMENT REQUEST message;
b. One or more back-off timer values; and
c. A 5G Mobility management (SGMM) cause to the SGMM cause #22 "Congestion" (for DNN only), the SGMM cause #67 "insufficient resources for specific slice and DNN" (for S-NSSAI and DNN combination), or the SGMM cause #69 "insufficient resources for specific slice" (for S-NSSAI only).

Upon receiving the DL NAS TRANSPORT message, the SGMM sublayer of the UE passes, to the SGSM sublayer of the UE, an indication that the message was not forwarded due to "DNN", "S-NSSAI only", or "S-NSSAI and DNN" based congestion control along with the PDU SESSION ESTABLISHMENT REQUEST message and the back-off timer values received.

Turning now to FIG. 4, FIG. 4 illustrates example transmissions between a user equipment and a communication system for releasing a PDU session in accordance with an example embodiment of the present disclosure. At operation 401, the UE 300 releases a PDU session for an S-NSSAI that is subject to capping of the number of PDU sessions per network slice. In some embodiments, the UE creates a PDU SESSION RELEASE REQUEST message and includes it in an UL NAS TRANSPORT message. The UE may also include the PDU session identity and a request type set to "PDU session release" in the UL NAS TRANSPORT message.

Upon receiving the UL NAS TRANSPORT message, if the request type in the UL NAS TRANSPORT message is set to "PDU session release" and the S-NSSAI and/or DNN associated with the PDU session identity is subject to capping, the AMF invokes the NSSF and sends an explicit indication to the NSSF that the capping applies for this S-NSSAI and/or the DNN of the PDU session released is sent. As illustrated in block 402, the AMF 302 transmits a service request message, such as an Nnssf_request message dedicated to enforcement of capping of the number of PDU sessions per network slice. The Nnssf_request message may include an indication of the S-NSSAI DNN with the PDU sessions subject to capping that the UE is no longer using.

At operation 403, the NSSF decrements or otherwise updates a counter associated with the S-NSSAI PDU session count. At operation 404, the NSSF transmits a service response, such as a Nnssf_service response dedicated to enforcement of the capping of the number of PDU sessions per network slice as an acknowledgment.

Turning now to FIG. 5, example transmissions are illustrated between a user equipment and a communication system for deregistering a user equipment in accordance with an example embodiment of the present disclosure. At operation 501, the UE 300 deregisters. If any of the S-NSSAIs in the allowed NSSAI were subject to capping, the AMF needs to report the S-NSSAIs have been abandoned by the UE and for each slice the AMF indicates the DNNs that the UE was using. If at least one S-NSSAI that is subject to capping of the number of PDU sessions per network slice is in the current allowed NSSAI for the UE 300, at operation 502, the AMF transmits a service request message, such as a Nnssf_request message dedicated to enforcement of capping of the number of PDU sessions per network slice. The Nnssf_request message includes indications of S-NSSAIs and/or DNNs with PDU sessions subject to capping that the UE is no longer using.

At operation 503, after receiving the request message, the NSSF decrements or otherwise updates one or more counters for the S-NSSAIs and/or DNNs of all the PDU sessions indicated in the request message. At operation 504, the NSSF transmits a service response, such as an Nnssf_service response dedicated to enforcement of capping of the number of PDU sessions per network slice as acknowledgement.

Turning now to FIG. 6, example transmissions are illustrated between a home NSSF and a visited NSSF in a communication system in accordance with an example embodiment of the present disclosure.

In some embodiments related to roaming, the NSSF of the visited Public Land Mobile Network (V-PLMN) can be configured per S-NSSAI of the H-PLMN to report to the H-PLMN NSSF that a user joins or leaves an S-NSSAI and DNN. In some embodiments, the NSSF of V-PLMN receives, from the AMF, a flag per S-NSSAI that indicates whether the S-NSSAI of the H-PLMN requires enforcement of the maximum number of PDU sessions per network slice. Accordingly, the H-PLMN NSSF controls the maximum number per H-PLMN of S-NSSAIs. If an upper limit is reached, the H-PLMN NSSF responds to the V-PLMN NSSF that the upper limit is reached and the NSSF may then indicate to the AMF.

As illustrated in 611, the V-NSSF 600 receives a message from an AMF that causes incrementing or decrementing of a PDU session counter for a certain S-NSSAI subject to capping of PDU sessions. The AMF detects that certain S-NSSAIs and/or DNNs are subject to capping of the number of PDU sessions per network slice and/or per data network and causes the addition or removal of a PDU session to the PDU session counters for these slices.

The S-NSSAI of the H-PLMN for these slices of the V-PLMN may be marked as requiring reporting to the H-PLMN. In some embodiments, the S-NSSAI is not marked but the requirement may be implicit based on that the counting and the H-PLMN S-NSSAI is included in the interaction with the NSSF. The V-NSSF is configured to report or be triggered to report the H-PLMN NSSF additions/removal of a UE to certain S-NSSAIs for certain S-NSSAIs of the H-PLMN.

As shown in 612, the V-NSSF transmits a service request message related or dedicated to enforcement of the capping number of PDU sessions per network slice and/or capping of the number of PDU sessions per UE. The service request message may include an indication of the H-PLMN S-NSSAIs with capping which required that a UE is no longer using the S-NSSAI or just began to use the S-NSSAI. As shown in 613, the H-NSSF 602 decrements or increments the counter for H-PLMN S-NSSAIs that have been abandoned or joined, respectively, and are subject to capping.

In some embodiments, as shown in 614, the H-NSSF 602 transmits an NSSF service response related or dedicated to enforcement of the capping number of PDU sessions per network slice and/or capping of the number of PDU sessions per UE to the V-NSSF 600. The NSSF service response may serve as an acknowledgement and may include any action of the H-PLMN S-NSSAIs that have reached the limit of the number of PDU sessions and any backoff timer. Upon receiving the NSSF service response, as shown in block 615, the V-NSSF interacts with the AMF to cause certain H-PLMN S-NSSAI(S) and related V-PLMN S-NSSAIs indicated in mapping information to be rejected. The V-NSSF may also transmit an indication of capping and any available backoff timer.

Turning now to FIG. 7, a PDU establishment process is illustrated in a PDU based approach for enforcement of the capping number of PDU sessions per network slice and/or capping of the number of PDU sessions per UE in a communication system in accordance with an example embodiment of the present disclosure. Other than several operations related to enforcement of the capping number of PDU sessions per network slice and/or capping of the number of PDU sessions per UE such as depicted by block 707b, other operations may be performed according to or at least consistent with various 3GPP technical specifications (TS) such as TS 23.502 and TS 29.502, in particular, FIG. 4.3.2.2.x and related descriptions in TS 23.502.

At 701, the UE transmits a PDU session establishment request to the AMF. The UE initiates the UE Requested PDU Session Establishment procedure by the transmission of a NAS message containing a PDU Session Establishment Request within the N1 SM container. The PDU Session Establishment Request may include a PDU session ID, Requested PDU Session Type, a Requested SSC mode, and Number Of Packet Filters.

At 702, the AMF performs a SMF selection. The AMF may also determine that the message corresponds to a request for a new PDU Session since the Request Type indicates an "initial request" and the PDU Session ID is not used for any existing PDU Session(s) of the UE.

At 703, the AMF transmits a Nsmf_PDUSession_CreateSMContext Request to the SMF based on the SMF selection. The 704, the SMF performs Subscription retrieval/Subscription for updates. At 705, the SMF transmits an Nsmf_PDUSession_CreateSMContext Response to the AMF. At 706, PDU Session authentication/authorization is performed by the UE and the various components of the core network. At 707a, the SMF performs PCF selection. At 707b, the SMF and the PCF performs Session Management (SM) Policy Association Establishment or SMF initiated SM Policy Association Modification. At 707b, the SMF also detects that the PDU session belongs to an S-NSSAI and/or DNN subject to capping of the maximum number of PDUs subject to capping. The PCF is configured to enforce any capping after incrementing a counter associated with the S-NSSAI and/or DNN.

If the cap or limit is reached the PDU session is rejected by the PCF and an optional back-off timer is applied, e.g., the SMF creates a PDU SESSION ESTABLISHMENT REJECT message including a back-off timer value (optional) and a SGSM cause value. The SGSM cause value may correspond to #26 "insufficient resources" (for DNN only), #67 "insufficient resources for specific slice and DNN" (for S-NSSAI and DNN combination), or #69 "insufficient resources for specific slice" (for S-NSSAI only). Alternatively, new cause codes may be defined and used. Then the PDU SESSION ESTABLISHMENT REJECT message is sent to the AMF. The AMF sends a DL NAS TRNSPORT message carrying the PDU SESSION ESTABLISHMENT REJECT message to the UE. A backoff timer may also be provided to the UE.

At 708, the SMF performs UPF selection. At 709, the SMF initiates SM Policy Association Modification. At 710a and 710b, the SMF transmits an N4 Session Establishment/Modification Request to the UPF and receives an N4 Session Establishment/Modification Response. At 711, the SMF transmits a Namf_Communication_N1N2MessageTransfer and receives a response. At 712, the AMF transmits a N2 PDU Session Request. At 713, the RAN and the UE perform AN-specific resource setup which may include PDU Session Establishment Accept. At 714, the RAN transmits a N2 PDU Session Response to the AMF and first uplink data may then be transmitted from the UE to the UPF.

At 715, the AMF transmits a Nsmf_PDUSession_UpdateSMContext Request to the SMF. The SMF may then transmit a N4 Session Modification Request to and receive a N4 Session Modification Response from the UPF at 719A and 719B. The SMF may also coordinate registration with the UDM at 719C. Then the first Downlink Data may be transmitted from the UPF to the UE.

The SMF may then transmit a Nsmf_PDUSession_UpdateSMContext Response and Nsmf_PDUSession_SMContextStatusNotify to the AMF at blocks 717 and 718. The SMF may also perform Internet Protocol (IP) Address Configuration with the UE and UPF. Block 720 indicates a unsubscription that may occur based on various conditions.

Turning now to FIG. 8, a PDU release process is illustrated in a PDU based approach for enforcement of capping number of PDU sessions per network slice and/or capping of the number of PDU sessions per UE in a communication system in accordance with an example embodiment of the present disclosure. Other than several operations related to enforcement of the capping number of PDU sessions per network slice and/or capping of the number of PDU sessions per UE such as block 801b, other operations may be performed according to or at least consistent with various 3GPP technical specifications (TS) such as TS 23.502 and TS 29.502, in particular, FIG. 4.3.3.4.2-1 and related descriptions in TS 23.502.

At block 801a, the UE transmits a PDU Session Release Request to the AMF and the AMF forwards the PDU Session Release Request to the SMF. At block 801b, the SMF coordinates Policy Association Termination with the PCF. When a PDU session is released for which capping PDU sessions per S-NSSAI and/or DNN applies, the SMF triggers a policy association termination in block 801b which may result in decrementing or otherwise updating a counter in the PCF for the S-NSSAI and/or DNN or both. At 801c, the AMF may invoke the Nsmf_PDUSession_ReleaseSMContext service operation to request the release of the PDU Session in case of a mismatch of PDU Session status between the UE and AMF. This operation may also be invoked due to a change of the set of network slices for a UE where a network slice instance is no longer available. At block 801*d*, the SMF may decide to release a PDU Session. At block 802*a*, the SMF sends an N4 Session Release Request (N4 Session ID) message to the UPF(s) of the PDU Session. At block 802*b*, the UPF(s) acknowledges the N4 Session Release Request by the transmission of an N4 Session Release Response (N4 Session ID) message to the SMF.

Blocks 803 *a* to *d* may be performed under various situations described below. If the PDU Session Release is initiated by the UE, the SMF responds to the AMF with the Nsmf_PDUSession_UpdateSMContext response (N2 SM Resource Release request, N1 SM container (PDU Session Release Command)) at block 803*a*.

At block 803*b*, if the PDU Session Release is initiated by the SMF, the SMF invokes the Namf_Communication_N1N2MessageTransfer service operation. At 803*c*, if the PDU Session Release is initiated by the AMF, the SMF responds to the AMF with the Nsmf_PDUSession_ReleaseSMContext response.

At block 804, the AMF transmits a Resource Release request to the RAN. At 805, when the (R)AN has received an N2 SM request to release the AN resources associated with the PDU Session, the (R)AN issues AN specific signalling exchange(s) with the UE to release the corresponding AN resources. At 806, if the (R)AN had received a N2 SM request to release the AN resources, the (R)AN acknowledges the N2 SM Resource Release Request by sending an N2 SM Resource Release Ack (User Location Information) Message to the AMF.

At 807*a*, the AMF invokes the Nsmf_PDUSession_UpdateSMContext (N2 SM Resource Release Ack, User Location Information) to the SMF. At 807*b*, the SMF responds to the AMF with an Nsmf_PDUSession_UpdateSMContext response.

At 808, the UE acknowledges the PDU Session Release Command by sending a NAS message (PDU Session ID, N1 SM container (PDU Session Release Ack)) message over the (R)AN.

At 809, the (R)AN forwards the NAS message from the UE by sending a N2 NAS uplink transport (NAS message (PDU Session ID, N1 SM container (PDU Session Release Ack)), User Location Information) to the AMF.

At 810*a*, the AMF invokes the Nsmf_PDUSession_UpdateSMContext (N1 SM container (PDU Session Release Ack, User Location Information) to the SMF. At 810*b*, the SMF responds to the AMF with an Nsmf_PDUSession_UpdateSMContext response. At 811, the SMF invokes an Nsmf_PDUSession_SMContextStatusNotify to notify AMF that the SM context for this PDU Session is released. At 812, if Dynamic PCC is applied to this session, the SMF invokes an SM Policy Association Termination procedure.

Figure 9A:
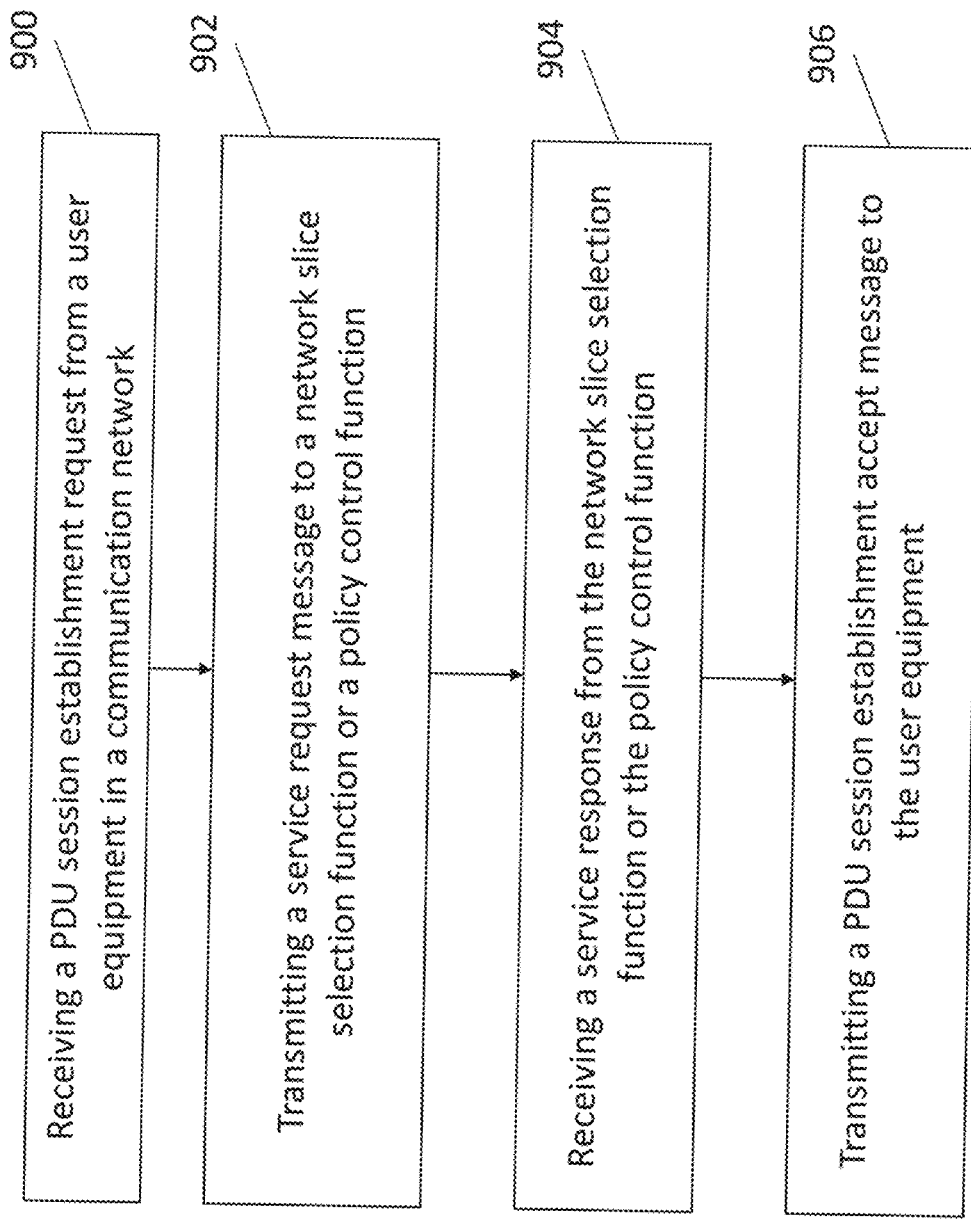

Referring now to FIGS. 9A, 9B, 9C, 9D, 9E, 9F, and 9G, workflows of various components of a communication system are illustrated in accordance with an example embodiment, such as an AMF, a V-NSSF, a SMF, or other components previously described in conjunction with other figures. Referring now to FIG. 9A, at block 900, the AMF includes means, such as the processor 202 and communication interface 208, for receiving a PDU session establishment from a user equipment in a communication network. In some embodiments, the PDU session establishment includes a requested NSSAI and/or a DNN. In some embodiments, the requested NSSAI includes one or more S-NSSAIs subject to capping of the number of PDU sessions per network slice. The NSSAI, S-NSSAI, and AMF may be the NSSAI, S-NSSAI, and AMF previously described in conjunction with FIG. 3.

At block 902, the AMF includes means, such as the processor 202 and communication interface 208, for causing transmission of a service request message to a network slice selection function or a policy control function (PCF). In some embodiments, the transmission of a service request message to, for example, a network slice selection function (NSSF) occurs upon detecting that the S-NSSAI is subject to the capping number of PDU sessions per network slice.

In some embodiments, the service request message may be related or dedicated to enforcement of the capping number of PDU sessions per network slice or data network. In some embodiments, the service request message may include an indication indicating that the S-NSSAI and/or DNN is subject to the capping number of PDU sessions per network slice or data network. For example, in some embodiments, the service request message may include the requested NSSAIs and optionally one or more flags indicating that capping is required for one or more S-NSSAIs and/or DNN subject to capping of the number of PDU sessions per network slice or data network and one or more flags indicating that capping is required for one or more S-NSSAIs and/or DNN subject to capping of the number of PDU sessions per UE. In some embodiments, the NSSF or PCF may be configured to increment or otherwise update one or more counters associated with the one or more requested S-NSSAIs and/or DNN subject to capping of the number of PDU sessions per network slice or data network and a counter with the capping of the number of PDU sessions per UE. In some embodiments, the service request message may be the service request message previously described in conjunction with FIG. 4.

At block 904, the AMF includes means, such as the processor 202 and communication interface 208, for receiving a service response from the network slice selection function or PCF. In some embodiments, the service response may be the service response previously described in conjunction with FIG. 4. In some embodiments, the service response may include the allowed NSSAI and may be dedicated to enforcement of the capping number of PDU sessions per network slice and/or capping of the number of PDU sessions per UE. In some embodiments, service response includes information representing that a PDU session cannot be established because the maximum number of PDU sessions per network slice or data network has been reached and an optional backoff timer that causes the UE to not attempt a PDU session establishment for the network slice or data network until the optional backoff timer expires. In some embodiments, the NSSF or PCF is configured to determine the number of PDU sessions on the one or more network slices associated with the S-NSSAI. For each S-NSSAI, in an instance where the number of PDU sessions exceeds a maximum number on the network slice associated with the S-NSSAI, the NSSF or PCF is configured in this example embodiment o reject the S-NSSAI and/or exclude the S-NSSAI from the allowed NSSAI. In some embodiments, the NSSF may determine the number of PDU sessions based on subscription information. In some embodiments, the PCF may determine the number of PDU sessions based on configuration information. In some embodiments, the NSSF or PCF increment or otherwise update counters for all S-NSSAIs that are allowed, thereby maintaining a count of the number of PDU sessions per slice.

Similarly, the PCF may be configured to determine the number of PDU sessions on the network slice or data network associated with the DNN based on configuration information such that in an instance in which the number of PDU sessions exceeds a pre-defined limit on the network slice or data network associated with the DNN, the PCF may reject the PDU session. The PCF may also determine the number of PDU sessions associated with the UE and if the number of PDU sessions associated with the UE exceeds a defined limit, the PCF may reject the PDU session.

At block 906, the AMF includes means, such as the processor 202 and communication interface 208, for causing transmission of a response to the PDU session establishment request message to the user equipment. The response to the PDU session establishment request message may be a PDU session establishment ACCEPT message that includes the allowed NSSAI. The PDU session establishment ACCEPT message may optionally include one or more rejected S-NSSAIs that are capped. If all of the requested S-NSSAIs are rejected or if all of the DNN are rejected, the response to may be a PDU session establishment REJECT message.

In some embodiments, in an instance where the PDU session associated with a S-NSSAI subject to the capping number of PDU sessions per network slice is released, the AMF may cause transmission of a message to the NSSF or the PCF indicating that the PDU session is released. The NSSF or the PCF may be configured to decrement or otherwise update one or counters associated with the S-NSSAI upon receiving the message.

In some embodiments, the NSSF is a visited Public Land Mobile Network (V-PLMN) NSSF caused to interact with a home Public Land Mobile Network H-PLMN (NSSF) to determine whether the maximum number of PDU sessions for the network slice is equaled or exceeded. In some embodiments, the NSSF is configured to transmit a message indicating that a PDU session is established for the UE in an instance which the PDU session is established for the UE.

Figure 9B:
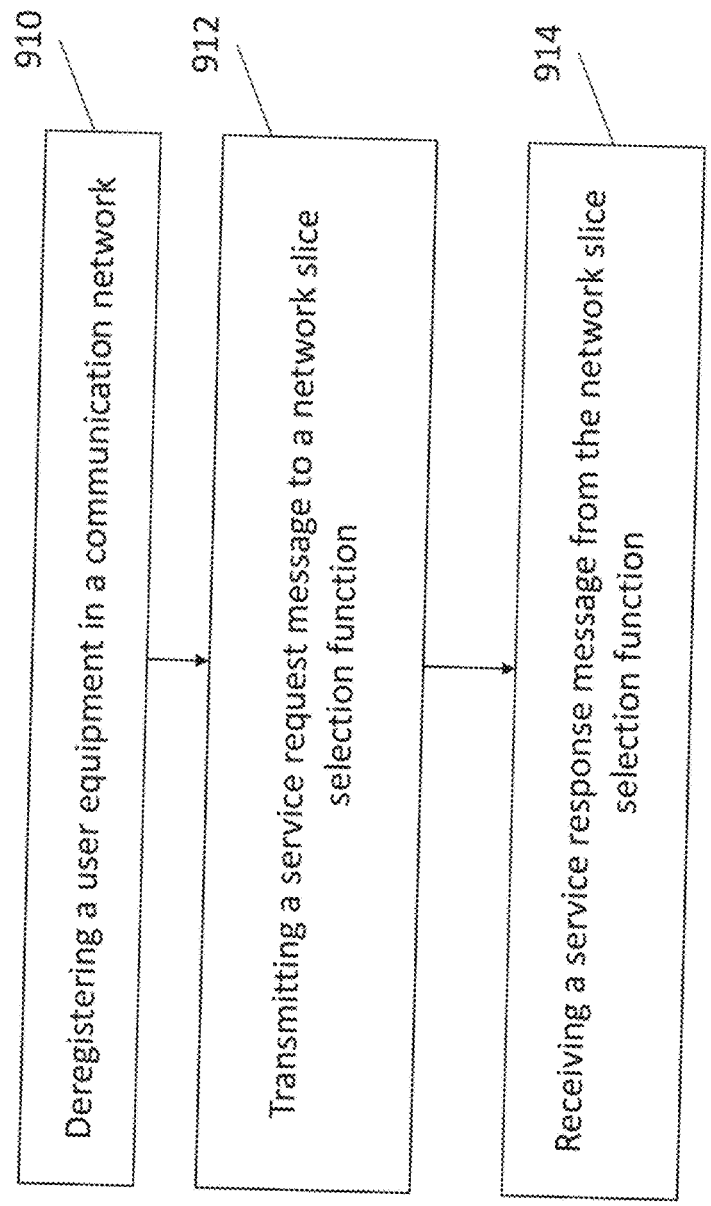

Referring now to FIG. 9B, at block 910, the AMF includes means, such as the processor 202 and communication interface 208, for deregistering a user equipment in a communication network.

At block 912, the AMF includes means, such as the processor 202 and communication interface 208, for causing transmission of a service request message to a network slice selection function. In some embodiments, the service request message includes an indication that the user equipment is no longer using one or more S-NSSAIs and/or subject to capping of the number of PDU sessions per network slice. In some embodiments, the service request message may be the service request message previously described in conjunction with FIG. 5. The NSSF may be configured to decrement or otherwise update one or more S-NSSAIs and/or DNN associated with PDU sessions that have been abandoned and are subject to capping.

At block 914, the AMF includes means, such as the processor 202 and communication interface 208, for receiving a service response message from the network slice selection function. In some embodiments, the service response message may be dedicated to enforcement of the capping number of PDU sessions per network slice and/or capping of the number of PDU sessions per UE and may serve as an acknowledgment. The service response message may be the service response message previously described in conjunction with FIG. 5.

Figure 9C:
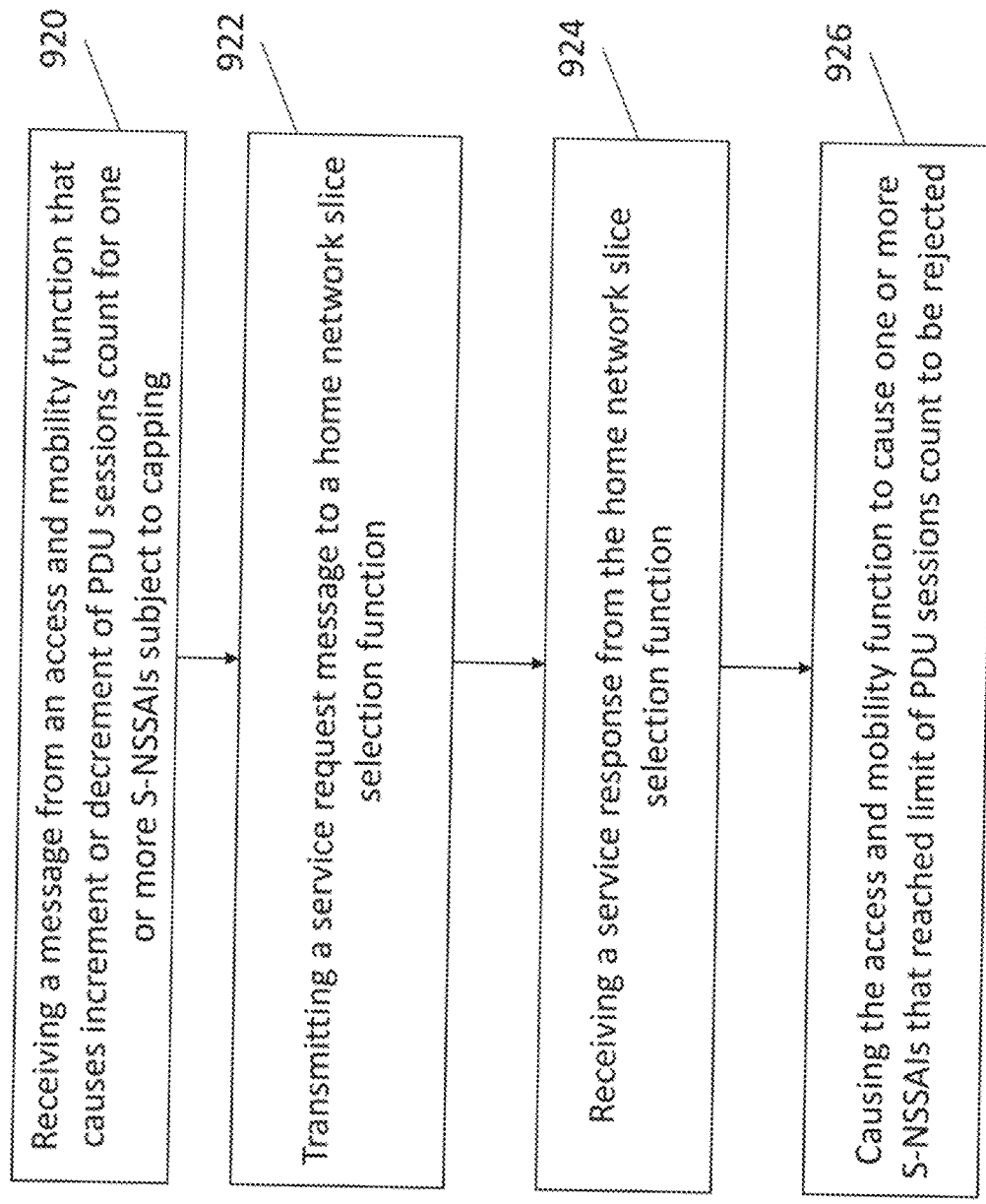

Referring now to FIG. 9C, at block 920, the V-NSSF includes means, such as the processor 202 and communication interface 208, for receiving a message from an access and mobility function that causes incrementing or decrementing of the PDU session count for one or more S-NSSAIs and/or DNN subject to capping. In some embodiments, the message may be the message from the AMF previously described in conjunction with FIG. 6.

In some embodiments, the V-NSSF is configured to report or be triggered to report the H-PLMN NSSF addition/removal of a PDU session for certain S-NSSAIs of the H-PLMN. At block 922, the V-NSSF includes means, such as the processor 202 and communication interface 208, for causing transmission of a service request message to a home network slice selection function. The service request message may be the service request message previously described in conjunction with FIG. 6. The service request message may be related or dedicated to enforcement of capping number of PDU sessions per network slice and/or capping of number of PDU sessions per UE. The service request message may include an indication of H-PLMNS-NSSAIs with capping which required that a UE is no longer using the S-NSSAI or just began to use the S-NSSAI. The H-NSSF may decrement or increment the counter for H-PLMN S-NSSAIs that have been abandoned or joined, respectively, and are subject to capping.

At block 924, the V-NSSF includes means, such as the processor 202 and communication interface 208, for receiving a service response message from the home network slice selection function. The service response may be the service response previously described in conjunction with FIG. 6. The service response is related or dedicated to enforcement of the capping number of PDU sessions per network slice and/or capping of the number of PDU sessions per UE. The NSSF service response may serve as an acknowledgement and may include any action of the H-PLMN S-NSSAIs that have reached the limit or cap and any backoff timer. Upon receiving the NSSF service response, the V-NSSF interacts with the AMf to cause certain H-PLMN S-NSSAI(S) and related V-PLMN S-NSSAIs indicated in mapping information to be rejected. The V-NSSF may also transmit an indication of the capping and any available backoff timer.

At block 926, the V-NSSF includes means, such as the processor 202 and communication interface 208, for causing the access and mobility function to cause one or more S-NSSAIs (H-PLMN S-NSSAIs and related V-PLMN S-NSSAIs in mapping information to be rejected) that reached the limit of PDU sessions count to be rejected access when a UE requests the one or more S-NSSAIs that already reached the limit of sessions count. The NSSF service response may serve as an acknowledgement and may include any action of the H-PLMN S-NSSAIs that have reached the limit or cap and any backoff timer. The V-NSSF may also transmit the indication of the capping and any available backoff timer.

Figure 9D:
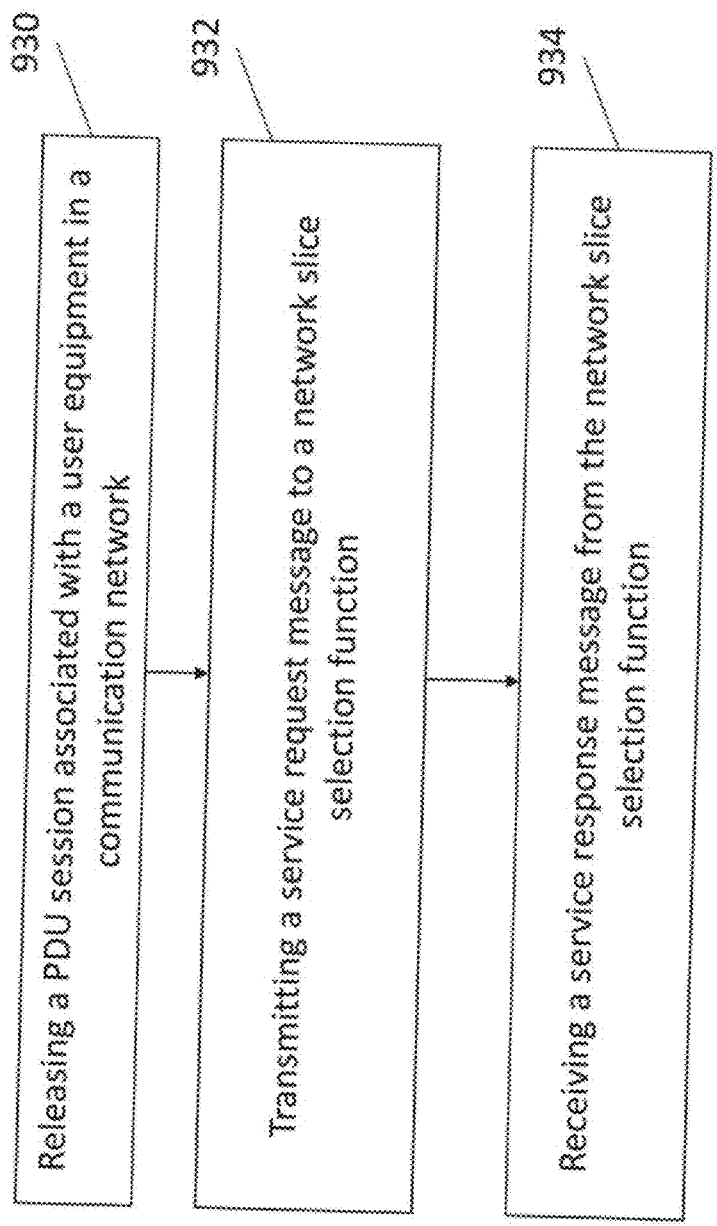

Referring now to FIG. 9D, at block 930, the AMF includes means, such as the processor 202 and communication interface 208, for releasing a PDU session associated with a user equipment in a communication network.

At block 932, the AMF includes means, such as the processor 202 and communication interface 208, for causing transmission of a service request message to a network slice selection function. In some embodiments, the service request message includes an indication that the user equipment is no longer using one or more S-NSSAIs with capping. In some embodiments, the service request message may be the service request message previously described in conjunction with FIG. 5. In some embodiments, the NSSF may be configured to decrement or otherwise update one or more S-NSSAIs associated with PDU sessions that have been abandoned and are subject to capping.

At block 934, the AMF includes means, such as the processor 202 and communication interface 208, for receiving a service response message from the network slice selection function. The service response message may be dedicated to enforcement of the capping number of PDU sessions per network slice and/or capping of the number of PDU sessions per UE and may serve as an acknowledgment. In some embodiments, the service response message may be the service response message previously described in conjunction with FIG. 5.

Figure 9E:
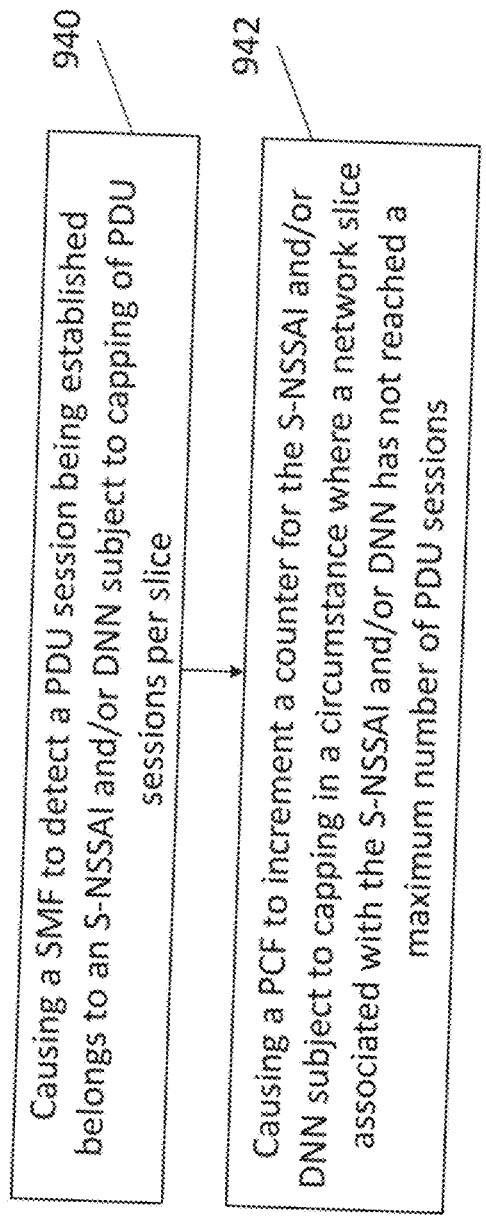

Referring now to FIG. 9E, at block 940, the core network includes means, such as the processor 202 and communication interface 208, for causing a SMF to detect a PDU session being established that belongs to an S-NSSAI and/or DNN subject to capping of the number of PDU sessions per network slice. At block 942, the core network includes means, such as the processor 202 and communication interface 208, for causing a PCF to increment a counter of the number PDU sessions associated with the S-NSSAI and/or DNN subject to capping in a circumstance where a network slice associated with the S-NSSAI and/or DNN has not reached a maximum number of PDU sessions. In a circumstance in which a network slice associated with the S-NSSAI and/or DNN has reached a maximum number of PDU sessions, the PCF may reject the PDU session. In some embodiments, the core network, PCF, and SMF may be the core network, PCF, and SMF previously described in conjunction with FIG. 7.

Figure 9F:
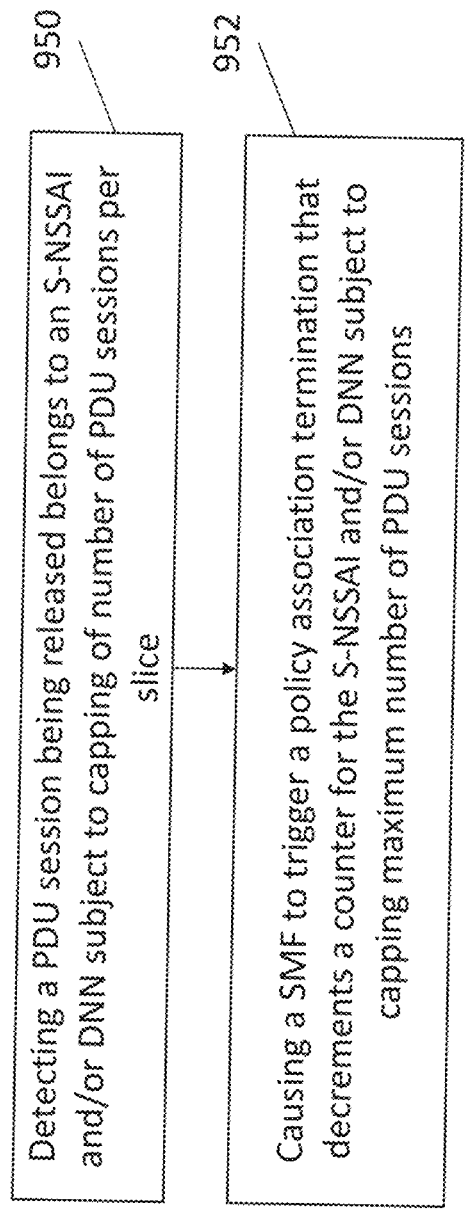

Referring now to FIG. 9F, at block 950, the core network includes means, such as the processor 202 and communication interface 208, for detecting a PDU session being released that belongs to an S-NSSAI and/or DNN subject to capping of the number of PDU sessions per network slice. At block 952, the core network includes means, such as the processor 202 and communication interface 208, for causing a SMF to trigger a policy association termination that decrements or otherwise updates a counter of the number of PDU sessions associated with the S-NSSAI and/or DNN subject to capping maximum number of PDU sessions. In some embodiments, the core network and SMF may be the core network and SMF previous described in conjunction with FIG. 8.

Figure 9G:
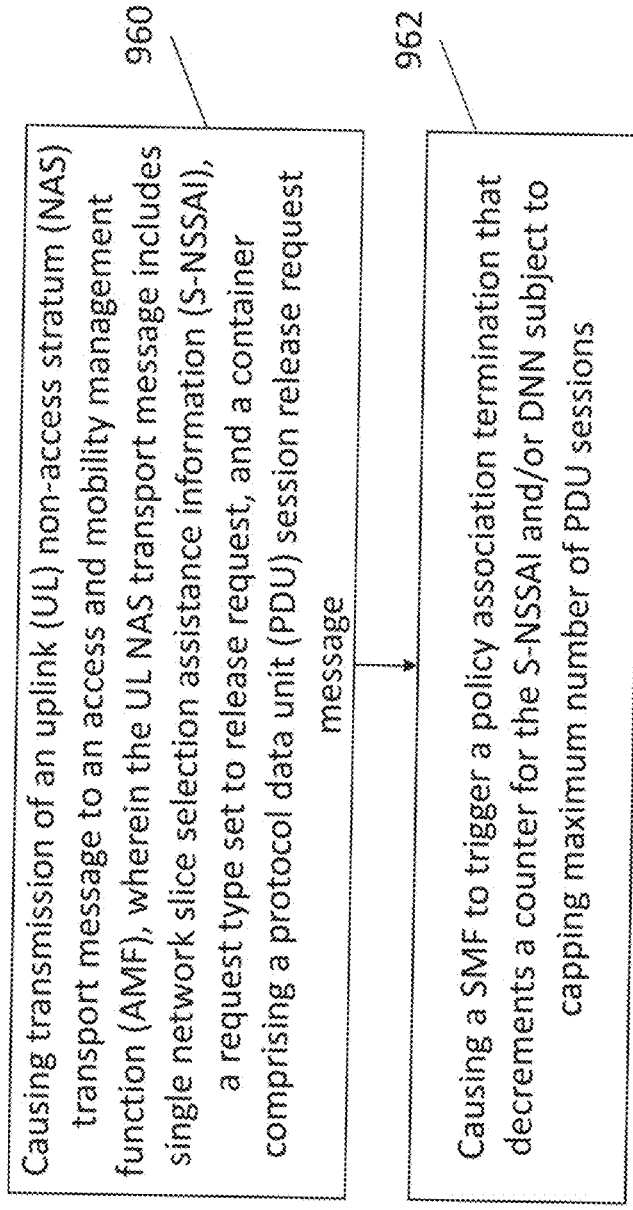

Referring now to FIG. 9G, at block 960, a user equipment includes means, such as the processor 202 and communication interface 208, for causing transmission of an uplink (UL) non-access stratum (NAS) transport message to an access and mobility management function (AMF). In some embodiments, the UL NAS transport message includes single network slice selection assistance information (S-NSSAI), a request type set to release request, and a container comprising a protocol data unit (PDU) session release request message. In some embodiments, the UL NAS transport message is the UL NAS transport message previously described in conjunction with FIG. 4.

At block 962, the user equipment includes means, such as the processor 202 and communication interface 208, for causing the AMF to transmit a message to a network slice selection function (NSSF) indicating that a PDU session is released in an instance where a PDU session associated with the S-NSSAI subject to the capping number of PDU sessions per network slice is released.

As described above, the method, apparatus and computer program product of an example embodiment therefore provide an enforcement mechanism for the maximum number of PDU sessions per network slice in a communication system. In some embodiments, the method, apparatus and computer program product provide the enforcement mechanism in a manner that emphasizes amongst the UEs having PDU sessions.

As described above, FIGS. 9A, 9B, 9C, 9D, 9E, 9F, and 9G are flowcharts of an apparatus 200, method, and computer program product according to an example embodiment of the disclosure. It will be understood that each block of the flowchart, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method performed by a session management function, the method comprising:
   receiving, from a user equipment (UE), through an access network (AN), a protocol data unit (PDU) session establishment request message that indicates a request for establishment of a PDU session for the UE, the PDU session establishment message comprising Single Network Slice Selection Assistance Information (S-NSSAI);
   upon detecting that a network slice associated with the S-NSSAI is subject to, for respective UE associated with the network slice, a respective cap on a number of PDU sessions on the network slice for the respective UE, transmitting a service request message to a policy control function, wherein the service request message includes an indication indicating that the network slice associated with the S-NSSAI is subject to the respective cap on the number of PDU sessions on the network slice for the respective UE, and wherein the indication relates to enforcing at the policy control function an increment of a counter associated with PDU sessions of the UE on the network slice associated with the S-NSSAI in an instance in which the network slice associated with the S-NSSAI has not reached the cap on the number of PDU sessions on the network slice for the UE;
   receiving a response to the service request message from the policy control function; and
   transmitting a response to the PDU session establishment request message to the UE based on the response to the service request message.

2. The method according to claim 1, wherein the policy control function is further configured to:
   determine, based on the service request message, a number of PDU sessions of the UE that are on the network slice; and
   in an instance in which the number of PDU sessions of the UE on the network slice equals or exceeds the cap on the number of PDU sessions on the network slice for the UE, determine the request for an establishment of a PDU session for the UE is rejected and generate the response to the service request message, wherein the response to the service request message indicates rejection of the request for an establishment of a PDU session for the UE.

3. The method according to claim 2, wherein the response to the service request message includes information representing that the PDU session for the UE cannot be established because the cap on the number of PDU sessions on the network slice for the UE has been reached, and a backoff timer that indicates the UE is to not attempt another request for establishment of a PDU session for the UE on the network slice until the backoff timer expires.

4. The method according to claim 3, wherein the response to the PDU session establishment request message comprises information representing that the PDU session for the UE cannot be established because the cap on the number of PDU sessions on the network slice for the UE has been reached, and the backoff timer that indicates the UE is to not attempt another request for establishment of a PDU session for the UE on the network slice until the backoff timer expires.

5. The method according to claim 1, wherein the detecting that the network slice associated with the S-NSSAI is subject to the cap on the number of PDU sessions on the network slice for the UE is based on subscription information.

6. The method according claim 1, further comprising transmitting a message to the policy control function indicating that a PDU session of the UE on the network slice is released in an instance in which the PDU session of the UE on the network slice, which is subject to the cap on the number of PDU sessions on the network slice for the UE, is released.

7. The method according to claim 6, wherein the message indicating that the PDU session of the UE on the network slice is released indicates the policy control function is to update one or more counters associated with the network slice associated with the released PDU session upon receiving the message indicating that the PDU session is released.

8. The method according to claim 1, wherein the policy control function comprises a visited Public Land Mobile Network (V-PLMN) NSSF which is caused to interact with a home Public Land Mobile Network H-PLMN (NSSF) to determine whether the maximum number of PDU sessions for the network slice is exceeded, and wherein the NSSF is configured to transmit a message indicating that a PDU session is established for the UE in an instance which the PDU session is established for the UE.

9. An apparatus comprising at least one processor and at least one memory including computer program code that, when executed by the at least one processor, cause the apparatus at least to perform:
   receiving, from a user equipment (UE), through an access network (AN), a protocol data unit (PDU) session establishment request message that indicates a request for establishment of a PDU session for the UE, the PDU session establishment message comprising Single Network Slice Selection Assistance Information (S-NSSAI) or a data network name (DNN);
   upon detecting that a network slice associated with the S-NSSAI or a data network associated with the DNN is subject to, for respective UE associated with the network slice, a respective cap on a number of PDU sessions on the network slice or the data network for the UE, transmitting a service request message to a policy control function (PCF), wherein the service request message includes an indication indicating that the network slice or the data network is subject to the respective number of PDU sessions on the network slice or the data network for the respective UE, and wherein the indication relates to enforcing at the PCF an increment of a counter associated with PDU sessions of the UE on the network slice associated with the S-NSSAI or the data network associated with the DNN in an instance in which the network slice associated with the NSSAI or the data network associated with the DNN has not reached the cap on the number of PDU sessions on the network slice or the data network for the UE;

receiving a response to the service request message from the PCF; and transmitting a response to the PDU session establishment request message to the UE based on the response to the service request message.

10. The apparatus according to claim 9, wherein the PCF is further configured to:

determine, based on the service request message, a number of PDU sessions on the network slice or the data network; and in an instance in which the number of PDU sessions on the network slice or the data network equals or exceeds the cap on the number of PDU sessions on the network slice for the UE, determine the request for an establishment of a PDU session for the UE is rejected and generate the response to the service request message, wherein the response to the service request message indicates rejection of the request for an establishment of a PDU session for the UE.

11. The apparatus according to claim 10, wherein the response to the service request message includes information representing that the PDU session for the UE cannot be established because the cap on the number of PDU sessions on the network slice or the data network for the UE has been reached, and a backoff timer that indicates the UE is to not attempt another request for establishment of a PDU session for the UE on the network slice or the data network until the backoff timer expires.

12. The apparatus according to claim 11, wherein the response to the PDU session establishment request message comprises information representing that the PDU session for the UE cannot be established because the cap on the number of PDU sessions for the network slice or the data network for the UE has been reached, and the backoff timer that indicates the UE is to not attempt another request for establishment of a PDU session for the UE on the network slice until the backoff timer expires.

13. The apparatus according to claim 9, where the detecting that the network slice associated with the S-NSSAI is subject to the cap on the number of PDU sessions on the network slice for the UE is based on subscription information.

14. The apparatus according to claim 9, wherein the computer program code, when executed by the at pest one processor, further cause the apparatus at least to transmit a message to the PCF indicating that a PDU session of the UE on the network slice or the data network is released in an instance in which the PDU session of the UE on the network slice or data network, which is subject to the cap on the number of PDU sessions on the network slice or the data network for the UE, is released.

15. A non-transitory computer-readable storage medium storing instructions, that when executed by an apparatus, cause the apparatus at least to:

receive, from a user equipment (UE), through an access network (AN), a protocol data unit (PDU) session establishment request message that indicates a request for establishment of a PDU session for the UE, the PDU session establishment message comprising Single Network Slice Selection Assistance Information (S-NSSAI);

cause, upon detecting that a network slice associated with the S-NSSAI is subject to, for respective UE associated with the network slice, a respective cap on a number of PDU sessions on the network slice for the respective UE, transmitting a service request message to a policy control function, wherein the service request message includes an indication indicating that the network slice associated with the S-NSSAI is subject to, the respective cap on the number of PDU sessions on the network slice for the respective UE, and wherein the indication relates to enforcing at the policy control function an increment of a counter associated with PDU sessions of the UE on the network slice associated with the S-NSSAI in an instance in which the network slice associated with the S-NSSAI has not reached the cap on the number of PDU sessions on the network slice for the UE;

receive a response to the service request message from the policy control function; and transmitting a response to the PDU session establishment request message to the UE based on the response to the service request message.

16. A method comprising:

detecting, by a session management function (SMF), a protocol data unit (PDU) session being established for a user equipment (UE) is associated with single Network Slice Selection Assistance Information (S-NSSAI) associated with a network slice subject to a respective cap on a number of PDU sessions for respective UE of a plurality of UE having at least one PDU session on the network slice, wherein the plurality of UE comprise at least the first UE and another UE; and sending a policy control function an indication to increment a counter associated with the first UE in a circumstance in which the cap on the number of PDU session for the first UE on the network slice has not reached a maximum number of PDU sessions corresponding to the cap for the first UE.

17. A method comprising:

detecting a PDU session for a first user equipment (UE) being released is associated with a single Network Slice Selection Assistance Information (S-NSSAI) associated with a network slice subject to a cap on a number of PDU sessions of the first UE on the network slice, wherein PDU sessions of a plurality of UE are associated with the network slice, the plurality of UE comprising the first UE and another UE, wherein respective UE of the plurality of UE are subject to a respective cap on a number of PDU sessions of the respective UE on the network slice, the cap on the number of PDU session of the first UE on the network slice a different cap than a cap on a number of PDU sessions of the another UE on the network slice;

sending, by a session management function to trigger a policy association termination that decrements a counter of the number of PDU sessions of the UE on the network slice associated with the S-NSSAI.

* * * * *